United States Patent
Koitabashi

(10) Patent No.: US 6,786,587 B2
(45) Date of Patent: Sep. 7, 2004

(54) INK-JET PRINTING APPARATUS

(75) Inventor: Noribumi Koitabashi, Yokohoma (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/340,762

(22) Filed: Jan. 13, 2003

(65) Prior Publication Data

US 2003/0122912 A1 Jul. 3, 2003

Related U.S. Application Data

(62) Division of application No. 09/219,895, filed on Dec. 24, 1998, now Pat. No. 6,533,409.

(30) Foreign Application Priority Data

Dec. 26, 1997 (JP) .............................. 9-361459
Dec. 26, 1997 (JP) .............................. 9-361460
Dec. 22, 1998 (JP) ............................. 10-364570

(51) Int. Cl.$^7$ ................................. B41J 2/17
(52) U.S. Cl. .................. 347/96; 347/100; 347/101; 428/195
(58) Field of Search ................. 347/95, 96, 100, 347/101, 105, 13–16, 50; 428/195; 400/120.15

(56) References Cited

U.S. PATENT DOCUMENTS

| | | | |
|---|---|---|---|
| 4,538,160 A | 8/1985 | Uchiyama ................ 346/140 R |
| 4,599,627 A | 7/1986 | Vollert ..................... 346/140 R |
| 5,124,201 A | * 6/1992 | Kurabayashi et al. ....... 428/195 |
| 5,169,436 A | 12/1992 | Matrick ..................... 106/20 D |
| 5,254,425 A | * 10/1993 | Suzuki et al. ................ 430/115 |
| 5,571,311 A | 11/1996 | Belmont et al. ........... 106/20 R |
| 5,574,530 A | 11/1996 | Sanada ........................ 396/604 |
| 5,606,055 A | * 2/1997 | Matsumoto et al. ........... 544/83 |
| 5,608,438 A | 3/1997 | Koike et al. ................. 347/100 |
| 5,619,241 A | * 4/1997 | Hosoi et al. ................. 347/105 |
| 5,644,350 A | 7/1997 | Ando et al. .................. 347/101 |
| 5,805,190 A | * 9/1998 | Tsuchii et al. ............... 347/195 |
| 5,835,116 A | 11/1998 | Sato et al. ..................... 347/98 |
| 5,864,350 A | 1/1999 | Shioya et al. .................. 347/40 |

(List continued on next page.)

FOREIGN PATENT DOCUMENTS

| | | |
|---|---|---|
| EP | 0 580 449 A1 | 1/1994 |
| EP | 0 587 164 A2 | 3/1994 |
| EP | 0 650 840 A2 | 5/1995 |
| EP | 0 678 396 A1 | 10/1995 |
| EP | 0 703 087 A2 | 3/1996 |
| EP | 0 724 968 A1 | 8/1996 |
| EP | 0 726 150 A2 | 8/1996 |
| EP | 0 726 155 A2 | 8/1996 |
| EP | 0 788 885 A2 | 8/1997 |
| EP | 0 791 470 A2 | 8/1997 |
| EP | 0 802 060 A2 | 10/1997 |
| EP | 0 802 246 A1 | 10/1997 |
| JP | 8-267903 | 10/1996 |
| JP | 8-281929 | 10/1996 |

*Primary Examiner*—Eugene H. Eickholt
(74) *Attorney, Agent, or Firm*—Fitzpatrick, Cella, Harper & Scinto

(57) ABSTRACT

Upon performing printing using a dye ink and a pigment ink and in addition a treatment liquid making those inks insoluble, two kinds of inks consisted of the pigment ink and the dye ink are used. After applying the pigment ink on a printing medium, the dye ink is applied overlaying with the pigment ink. After mixing these inks on the printing medium, the treatment liquid which makes the inks insoluble, is applied. In the alternative, a mixed ink in which a pigment ink not requiring a dispersant and the dye, is used. After application of this mixed ink on the printing medium, the treatment liquid which makes the ink insoluble, is applied. Therefore, problem of "crack", "soaking out", "overflow" or lowering of OD value which can be caused upon reaction of the pigment ink and the dye ink or the mixed ink with the treatment liquid, can be solved to achieve high quality printing.

24 Claims, 18 Drawing Sheets

U.S. PATENT DOCUMENTS

| | | | |
|---|---|---|---|
| 5,898,263 A * | 4/1999 | Itou et al. | 313/474 |
| 5,953,026 A | 9/1999 | Yoshino | 347/36 |
| 5,959,641 A | 9/1999 | Yokoi | 347/98 |
| 6,024,439 A * | 2/2000 | Sueoka et al. | 347/50 |
| 6,027,210 A | 2/2000 | Kurabayashi et al. | 347/100 |
| 6,062,674 A | 5/2000 | Inui et al. | 347/43 |
| 6,074,052 A | 6/2000 | Inui et al. | 347/101 |
| 6,089,697 A | 7/2000 | Tajika et al. | 347/43 |
| 6,099,116 A | 8/2000 | Fujita et al. | 347/101 |
| 6,102,537 A * | 8/2000 | Kato et al. | 347/101 |
| 6,114,411 A * | 9/2000 | Nakamura et al. | 523/161 |
| 6,120,141 A | 9/2000 | Tajika et al. | 347/96 |
| 6,123,411 A | 9/2000 | Inui et al. | 347/43 |
| 6,135,656 A * | 10/2000 | Kato et al. | 400/120.15 |
| 6,137,507 A | 10/2000 | Inui et al. | 347/101 |
| 6,164,754 A | 12/2000 | Ide et al. | 347/90 |
| 6,164,773 A | 12/2000 | Oikawa | 347/101 |
| 6,206,516 B1 | 3/2001 | Moriyama et al. | 347/101 |
| 6,350,022 B1 | 2/2002 | Takemura et al. | 347/96 |
| 6,379,000 B1 | 4/2002 | Koitabashi | 347/100 |
| 6,471,757 B1 | 10/2002 | Koitabashi et al. | 106/31.28 |
| 6,582,047 B2 * | 6/2003 | Koitabashi | 347/16 |

* cited by examiner

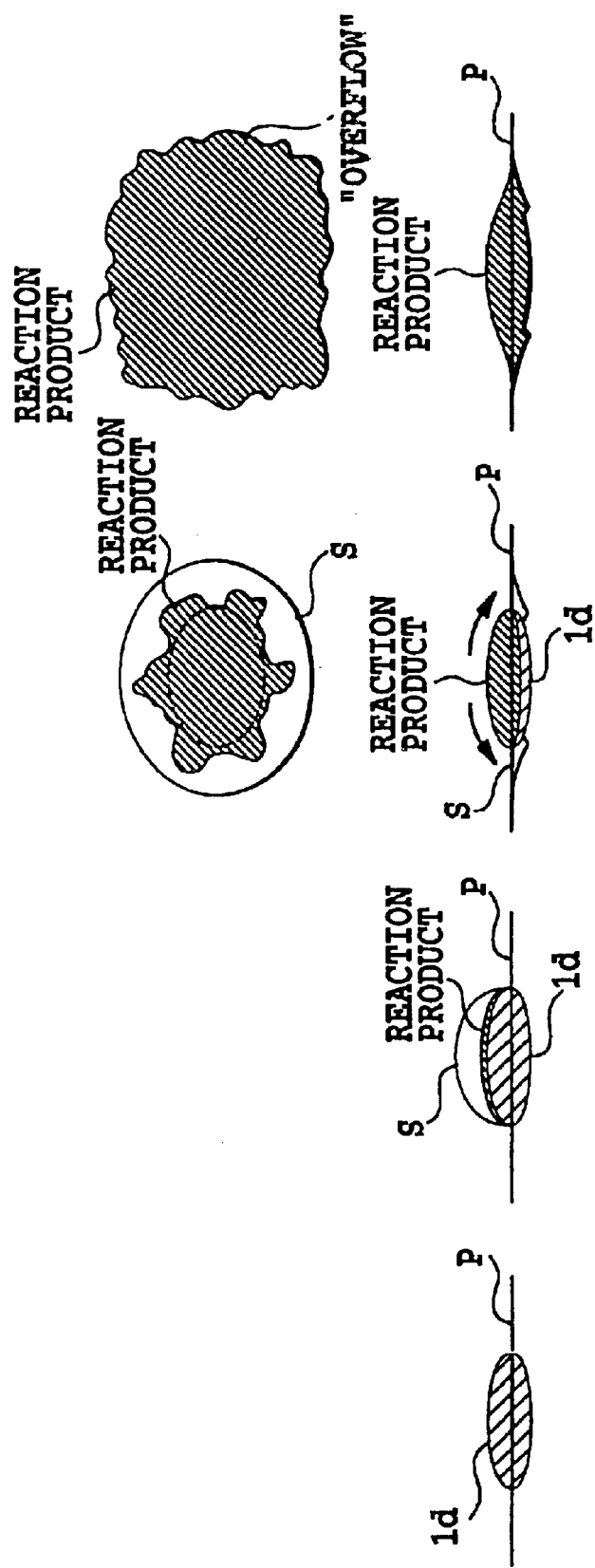

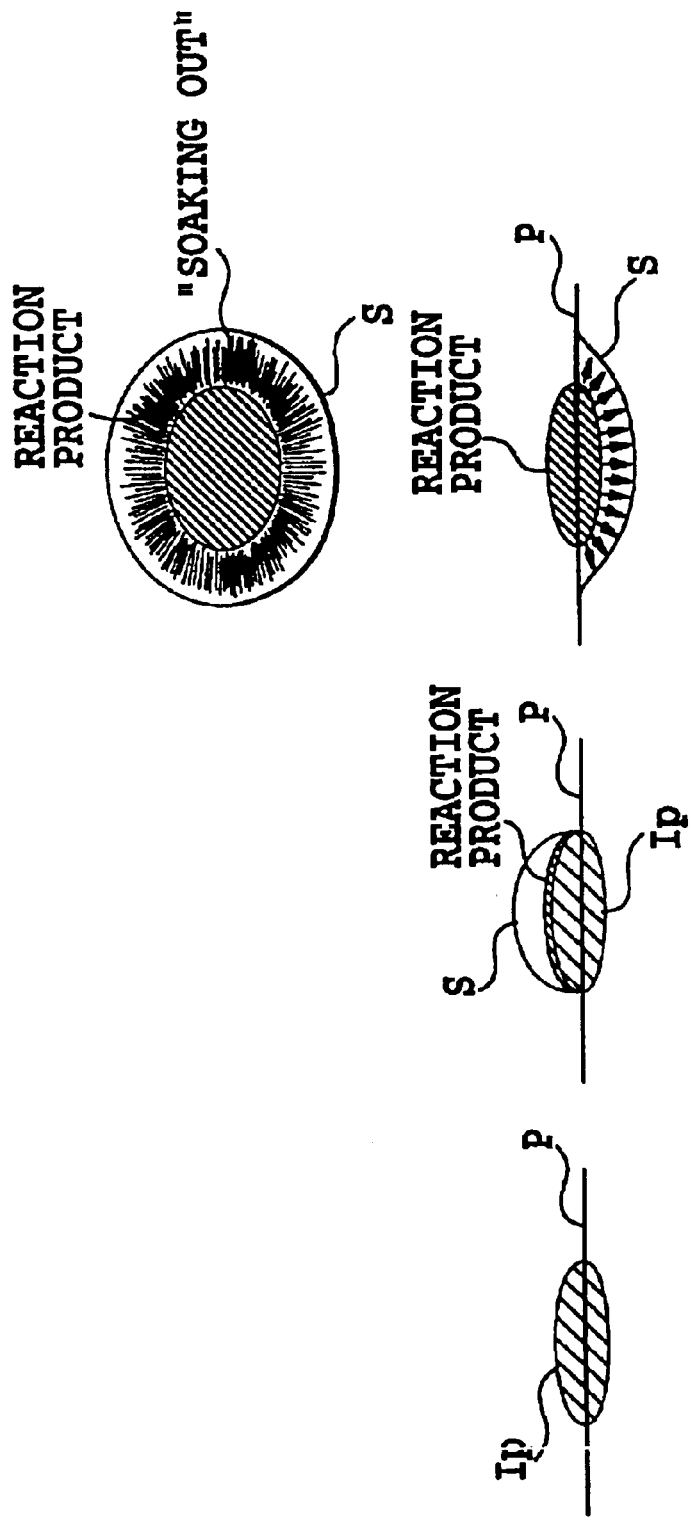

INK-JET PRINTING APPARATUS

This application is a division of Ser. No. 09/219,895 filed Dec. 24, 1998 and now U.S. Pat. No. 6,533,409.

BACKGROUND OF THE INVENTION

1. Field of the Invention

The present invention relates generally to an ink-jet printing apparatus and a printing method. More particularly, the invention relates to an ink-jet printing apparatus and a printing method performing printing of characters, images and the like on a printing medium, such as a printing paper, an OHP film and the like using an ink and a liquid which makes a coloring material in the ink insoluble (hereinafter also referred to as a treatment liquid).

2. Description of the Related Art

A treatment liquid of this kind reacts with a coloring material contained in an ink, such as a pigment, dye and the like and makes the coloring material insoluble. In ink-jet printing technology, in general, the treatment liquid is ejected to overlay the portion of the printing medium where the ink is ejected or in the vicinity thereof, for admixing the ink and the treatment liquid to cause a reaction. Then, as a result of the reaction, the coloring material of the ink is fixed on the surface of the printing medium or penetrating into the printing medium for achieving water resistance of the printing product.

It has also been known that action for making the coloring material in the ink insoluble also serves for limiting penetration of the pigment or dye in a surface layer of the printing medium, to result in improvement of an optical density of the printing medium (hereinafter occasionally simply referred to as "OD value").

However, in the conventional ink-jet printing technology using the foregoing treatment liquid, it has been newly recognized by the inventors that there have been respective problems with the coloring materials to be employed in the ink for improving printing quality.

When a dye is used as the coloring material, a first problem that has been encountered is that a sufficiently high OD value cannot be obtained even when the dye and the treatment liquid react. This is because that the dye per se cannot develop a relatively low OD value as used for printing. Therefore, even if the treatment liquid and the dye are reacted to fix most of the dye in the surface layer of the printing medium as above-mentioned, the OD value is as high as the case where pigment is used as the coloring material.

The second problem the inventors have encountered with the dye is a phenomenon called "overflow" or "sweep", blurring an edge portion of a printed image.

FIGS. 1A to 1D are illustrations for explaining this phenomenon. As shown in FIG. 1A, when an ink $I_d$ using a dye as a color agent, is deposited on the lower penetrative printing medium P, such as a plane paper, by ejection of the ink through a printing head as an ejecting portion, a part of the ink penetrates into the printing medium and the remaining part of the ink is present in a liquid state on the surface of the printing medium P. Then, as shown in FIG. 1B, in the similar manner, a treatment liquid S is deposited over the ink $I_d$ to cause a reaction in the boundary between the treatment liquid S and the ink $I_d$, by ejection through the printing head. As shown in FIG. 1C, a part of a reaction product flows out to the circumference of the ink $I_d$ and flows into the lower side of the ink $I_d$. Then, a reaction between the dye in the ink $I_d$ and the treatment liquid S gradually progresses. Finally, an ink dot consisting of the reaction product of the dye and the treatment liquid is formed as shown in FIG. 1D The ink dot thus formed has a contour portion where the ink flows over a contour of the dot.

According to a prediction by the inventor, the foregoing phenomenon is caused by the flow of a gel from a high viscous reaction product in the ink and the treatment liquid for a relatively low reaction speed between the dye and the treatment liquid.

Flowing out of the ink in the ink dot shown in FIG. 1D due to such phenomenon makes a contour blur at the edge portion of an image, and appears as a so-called "overflow" to cause degradation of the printing quality. Fluidizing of the foregoing reaction product also causes "sweeping" of the reaction product in the direction of the relative speed between the fed printing medium and the printing head for the treatment liquid. For this reason also, it has been predicted that the edge portion of the printed image becomes blurry.

The second problem concerning the dye set forth above may not occur where only dye ink is used and the treatment liquid is not used in printing. Accordingly, where printing is performed using the dye ink and the treatment liquid which makes the dye ink insoluble, this particular technical problem is encountered.

Moreover, even if printing is performed using an ink including a pigment as the coloring material and the treatment liquid therefor, a particular problem caused by the reaction between the ink and the treatment liquid will be explained hereinafter.

The pigment ink per se exhibits a relatively high OD value as used for printing. By reaction with the treatment liquid, owing to the effect of the treatment liquid set forth above, the OD value of the pigment ink can be improved. In comparison with the foregoing dye, the pigment has a high reaction speed with the treatment liquid.

However, as the first program in the case where pigment is used, the inventors have found a problem they call "crack". Namely, when reaction of the pigment ink and the treatment liquid is caused especially on the film-like printing medium for an OHP, since the reaction speed of the pigment with the treatment liquid is high as set forth above, most of the pigment coagulates on the surface before penetration into the printing medium. Furthermore, owing to the property of the pigment, the pigment may coagulate strongly. Therefore, after a solvent in the ink once penetrates into the printing medium and is fixed therein, the coagulated reaction product set forth above will become relatively large individual blocks due to the coagulation force to form gaps not filled in by the reaction product between these individual blocks. This phenomenon is perceived as a "crack" upon observing the recording medium visually to degrade the quality of the printed image. When the foregoing reaction product is not filled in, the surface of the printing medium is exposed, to lower the OD value of the overall printed image.

Pigment ink includes an ink using a dispersant, such as a resin, a surface-active agent and the like, in order to stabilize dispersion of the pigment in the ink solvent (hereinafter occasionally referred to as dispersant-containing pigment ink), and an ink using a self-dispersion type pigment and containing no dispersant (hereinafter occasionally referred to as no dispersant containing pigment ink). The second problem concerning pigment ink is cause in the case where the latter no dispersant containing pigment ink and the treatment liquid are used.

The inventor has observed the phenomenon called "soaking out" or "blur" in a dot formed on the printing medium using the no dispersant containing pigment ink and the treatment liquid. FIGS. 2A to 2C are illustrations for predictively explaining this phenomenon.

After the application of the no dispersant containing pigment ink $I_p$ on the printing medium P such as plain paper (see FIG. 2A), the treatment liquid is applied in an overlaying manner (see FIG. 2B). Then, production of reaction product is initiated, at first, from the reaction between the ink and the treatment liquid. Then, according to progress of this reaction, radial "soaking out" is caused from a substantially circular dot of the reaction product to "blur" the entire circumference of the dot (see FIG. 2C). Such "soaking out" or "blur" appears similar to known feathering. Accordingly, the printing quality is lowered.

The foregoing "soaking out" or "blur" is inferred as the following phenomenon chemically or in micro view. The no dispersant containing pigment ink has a relatively high reaction speed in reaction-with the treatment liquid. Therefore, the dispersed pigment instantly causes dispersion breakage to generate clustering of the reaction product. In conjunction therewith, a particulate reaction product is also generated. Then, the particulate reaction product flows out with penetration of the treatment liquid into the printing medium to result in the foregoing "soaking out" phenomenon.

As set forth above, in either case of performing printing using the dye ink and the treatment liquid and performing printing using the pigment ink and the treatment ink, there have been problems newly recognized by the inventors, in improving the printing quality, to be solved.

Associated with the respective foregoing problems, the applicant of the present invention has proposed the use of an ink and treatment liquid using dye ink and pigment ink containing dispersant (Japanese Patent Application Laid-open No. 8-267903). However, the invention disclosed in the above-identified patent application is different from the present invention.

SUMMARY OF THE INVENTION

The present invention has been worked out for solving the technical problems set forth above. It is therefore an object of the present invention to provide an ink-jet printing apparatus and a printing method that can solve or improve respective technical problems caused upon printing by using a dye ink or a pigment ink and a treatment liquid thereof to enable high quality printing.

Another object of the present invention is to provide an ink-jet printing apparatus and a printing method which can speed up a printing speed upon performing printing using the ink and the treatment liquid.

In a first aspect of the present invention, there is provided an ink-jet printing apparatus, in which after application of an ink containing a coloring material onto a printing medium, a treatment liquid making the coloring material of the ink insoluble is applied, the ink being a mixed ink, in which a self dispersion type pigment and a dye are mixed, comprising:

application means for separately applying the mixed ink and the treatment liquid onto the printing medium, for mixing the mixed ink and the treatment liquid in a liquid state on the printing medium.

According to a second aspect of the present invention, there is provided an ink-jet printing apparatus, in which after the application of an ink containing a coloring material onto a printing medium, a treatment liquid making the coloring material of the ink insoluble is applied, the ink being a mixed ink, in which a self dispersion type pigment and a dye are mixed, comprising:

application means for separately applying the mixed ink and the treatment liquid onto the printing medium, for mixing the mixed ink and the treatment liquid in a liquid state on the printing medium, and for mixture of the mixed ink and the treatment liquid, where a mixed ink, in which the self dispersion type pigment and the dye are mixed, is further applied on the printing medium in a liquid state.

In a third aspect of the present invention, there is provided an ink-jet printing apparatus employing an ink ejecting portion ejecting an ink and a treatment liquid ejecting portion ejecting a treatment liquid making an ink ejected from the ink ejecting portion insoluble and performing printing by ejecting the treatment liquid after ejection of the ink toward a printing medium, the ink ejecting portion being constituted of at least one mixed ink ejecting portion for ejecting a mixed ink, in which a self dispersion type pigment and dye are mixed, comprising:

ejecting portion arranging means for arranging the mixed ink ejecting portion and the treatment liquid ejecting portion in a predetermined positional relationship; and control means for relatively moving respective ejecting portions arranged in the arranging means and the printing medium, ejecting the mixed ink and the treatment liquid from respective ejecting portions and mixing the mixed ink and the treatment liquid on the printing medium.

In a fourth aspect of the present invention, there is provided a printing method performing printing by applying a mixed ink, in which a self dispersion type pigment and a dye are mixed, onto a printing medium, and thereafter applying a treatment liquid making the self dispersion type pigment and the dye in the mixed ink insoluble, comprising:

a step of mixing at least the mixed ink and the treatment liquid by applying the mixed ink and the treatment liquid onto the printing medium.

In a fifth aspect of the present invention, there is provided a printing method performing printing by applying an ink containing a coloring material, and thereafter applying a treatment liquid making the coloring material in the ink insoluble, and the ink being a mixed ink, in which a self dispersion type pigment and a dye are mixed, comprising:

a step of separately applying the mixed ink and the treatment liquid onto the printing medium, mixing the mixed ink and the treatment liquid on the printing medium in liquid state, and, for a mixture of the mixed ink and the treatment liquid, a mixed ink, in which the self dispersion type pigment and dye are mixed, is mixed on the printing medium in a liquid state.

According to the present invention, since the mixed ink and the treatment liquid are mixed on the printing medium, "crack" or "soaking out", which could be caused upon printing by using only the pigment ink and the treatment liquid, can be suppressed by the presence of the dye simultaneously mixed. Conversely, lowering of the OD value or "overflow", which could be caused upon printing by using only the dye ink and the treatment liquid, can be compensated for, or suppressed by the presence of the simultaneously mixed pigment.

In the present invention, the treatment liquid is effective if the penetration speed is higher than or equal to 5.0 $(ml/m^2 \cdot msec^{1/2})$ in Ka value by the Bristow method. Thus, in addition to the effect in the case where printing is performed by using the mixed ink and the treatment liquid, since the treatment liquid has a relatively high penetration ability, the reaction product of the pigment or the like and the treatment liquid may also have high penetration ability to achieve high penetration speed as a whole.

First Practical Aspect

In a practical aspect of the present invention, the ink using the dye and the pigment with no dispersant as coloring materials (hereinafter referred to as mixed ink) is applied to the printing medium to form a dot of the reaction product by applying the treatment liquid.

FIGS. 3A to 3C are illustrations for explaining dot formation. As shown in FIG. 3A, at first, the mixed ink $I_m$ is applied to the printing medium. Then, as shown in FIG. 3B, the treatment liquid is applied overlaying the mixed ink $I_m$. Therefore, the reaction product generated by reaction of the mixed ink $I_m$ and the treatment liquid S is fixed on the surface and inside of the printing medium P to form the dot.

According to one practical aspect, since the ink containing the dye and the pigment without dispersant is used for printing, lowering of the OD value caused by the dye ink can be compensated for by the pigment ink to enhance the OD value. Also, most of the reaction product of the ink as mixed with the treatment liquid may stay in an upper layer of the printing medium to contribute to an increase of the OD value.

When ink having low penetration speed is used as the mixed ink, even if the interval following the application of the treatment liquid provides a relatively long period for penetration, the amount of the coloring material staying in the surface layer of the printing medium can be made large to further improve the OD value. In other words, even if ink having a low penetration speed is used, i.e., the ink in which dye and pigment having no dispersants are mixed, the problem to be caused in using the dye ink and the pigment ink alone can be solved or reduced. By using ink having an even lower penetration speed, increasing of the OD value can be expected. Furthermore, the normal effect of using ink having a low penetration speed, i.e., so-called feathering, can be suppressed.

Next, the maximum effect of the invention, in which the treatment liquid is applied after application of the mixed ink on the printing medium, is to solve the problem of "overflow" or "sweep" caused by the dye ink and to solve or reduce the problem of "soaking out" or "blur" caused by the pigment ink, simultaneously.

According to the inventors, the principle for achieving these effects can be explained as follow. After the application of the mixed ink onto the printing medium, the treatment liquid is applied. Then, the dye and the treatment liquid react to form a gel-form, high viscous substance. The pigment having no dispersant causes breakage of dispersion by reaction with the treatment liquid. It is understood that a fine particle of the pigment generated by dispersion breakage is taken into the high viscous substance of the dye reaction product to restrict "soaking out" or "blur" that could be caused by flowing out of the pigment particle. The high viscous substance taking in the pigment particles has a not so high flowability in comparison with the reaction product of the dye alone and the treatment liquid. Accordingly, the occurrence of "overflow" or "sweep" can be suppressed simultaneously. Where the treatment liquid is applied to the mixture of the dye and the pigment having no dispersant, the fine particle of the pigment generated by dispersion break- age is taken in the gel form reaction product so as not to deeply penetrate into the printing medium to bury the gap between the fibers of the printing medium in the surface layer thereof. Then, the gel-form dye reaction product fills the gap between absorbed particles and the unevenness of the fiber on the surface of the printing medium. Therefore, irregular reflection of the light can be prevented to achieve an OD value higher than that achieved when the pigment and the treatment liquid are used.

According to one practical aspect of the invention, as diagrammatically shown in FIG. 3C, the phenomena that tend to degrade the printing quality, such as "blur", "overflow" or the like, can be prevented. Furthermore, increasing of the OD value can be achieved.

The phenomena of "blur" or "overflow" tend to be caused by reaction of the pigment ink or the dye ink with the treatment liquid before penetration into the printing medium. Therefore, in order to suppress the occurrence of these phenomena, it becomes necessary to apply the treatment liquid after waiting for penetration of the dye ink or the like, which interferes with speeding up of the printing speed. However, since "blur" or the like can be suppressed by the mixed ink per se, which is a mixture of the dye and the pigment ink having no dispersant, it becomes unnecessary to set a waiting interval to await penetration of the dye ink before applying the treatment liquid. Accordingly, speeding up of the printing speed will not be interfered with. In other words, the OD value can be further improved by using the mixed ink of a practical aspect of the present invention having a relatively low penetration ability so that the coloring material, such as the pigment or the like, may stay in the surface layer of the printing medium for a long period.

In addition, in the inkjet printing apparatus employing the full-multi type head, the interval from the application of the mixed ink to the application of the treatment liquid can be shortened to speed up, the printing speed for the first one printing medium, known as the first print. On the other hand, since the foregoing interval can be shortened, down-sizing of the apparatus and lowering of cost can be achieved.

The order of application of the mixed ink and the treatment liquid onto the printing medium according to a practical aspect of the present invention is that the treatment liquid is applied after application of the mixed ink on the printing medium, as set forth above to attain the foregoing effect.

It is also within the scope of the invention to use the foregoing order of application in a serial-type head that scans the same region a plurality of times with an interval for paper feeding.

While the invention calls for applying the mixed ink in advance of applying the treatment liquid, the number of droplets of the mixed ink to be applied is not limited to one droplet as set forth above.

For example, it may be possible to apply two droplets of the mixed ink in advance of application of the treatment liquid. In this case, preferably, among these two droplets, the mixed ink applied at an earlier timing contains a greater proportion of dye than the pigment having no dispersant, and the mixed ink applied at the later timing contains a greater proportion of pigment having no dispersant than the dye. Therefore, upon the reaction with the treatment liquid applied later, a greater proportion of pigment may react with the treatment liquid to further suppress flow out of the reaction product of the dye and the treatment liquid. As another practical aspect of the invention that can achieve the equivalent effect, the number of the mixed ink droplets to be applied in advance of application of the treatment liquid is set to three and the proportions of the pigment having no dispersant are preferably increased in the mixed ink to be applied at a later timing.

When a plurality of mixed ink droplets are applied, the total amount of the applied ink is set to be substantially equal to the case where one droplet is applied. In other words, according to a practical aspect of the present invention, when the mixed ink is applied a plurality of times, even if the amount of the ink in each applied droplet is reduced, the foregoing effect can be attained.

Differences in the timings of the application of the mixed ink and the treatment liquid may be encompassed within the scope of the present invention as long a respective effect of the practical aspect of the present invention can be achieved, similarly to the order of application set forth above.

More specifically, different modes of reaction between the mixed ink and the treatment liquid occur, depending upon the timing from the application of the mixed ink to the application of the treatment liquid. For example, when the time is short, mixing of the mixed ink and the treatment liquid becomes insufficient. In the circumferential portion of the dot formed by overlaying the mixed ink and the treatment liquid, namely the edge portion, mixing of the pigment or the like and the treatment liquid can be done sufficiently to achieve the advantageous effect of the present invention, particularly in suppression of "blur" or "overflow".

Therefore, in this disclosure, "mix" and "mixing" of the mixed ink and the treatment liquid refers not only to complete mixing but also to partial mixing at the edge portion, and so on. Furthermore, "mix" and "mixing" of the mixed ink and treatment liquid also refers to mixing after penetration into the printing medium. Modes of all of these mixing operations will be defined as "mixing in a liquid state".

The color (kind), density, and number of the ink droplets applied according to the present invention can be combined arbitrarily as long as the foregoing order of application is maintained. For example, as the kind of ink, black (Bk), yellow (Y), magenta (M) and cyan (C) inks are used generally. Concerning respective colors, high and low density inks may also be used. Further, with taking at least one of yellow ink, magenta ink and cyan ink as mixed ink according to the present invention, and using the treatment liquid, the mixed ink and the treatment liquid are applied in sequential order.

Among such combinations, to which the present invention is applicable, the most preferred mode is for the mixed ink to comprise black ink. According to this combination, the advantageous, effect of the invention, such as increasing of the OD value, and suppressing of "blur" or "overflow" contributes to the printing quality of characters, such as letters or the like.

As a method of applying the mixed ink, and so on, to the printing medium, various methods, such as the application method or directly contacting the ink, or the like, to the printing medium, and so on, may be encompassed within the scope of the present invention. The most preferred mode is the ink-jet printing mode employing a printing head. In this case, the combination and arrangement of the printing head or heads as the ejecting portion is determined according to the combination of the application order and the kinds of ink and treatment liquid.

Particularly, by a construction, in which the heads for the mixed ink and the treatment liquid are arranged in a direction of relative movement of the printing head with respect to the printing medium, the foregoing sequential order of application becomes possible.

More specifically, either a so-called full-multi type printing head may be used, in which the ink ejection openings are arranged within a range corresponding to the entire width of the printing region in the printing medium, or a serial type printing head may be used, in which scanning occurs relative to the printing medium. Either case permits the application of the ink and the treatment liquid.

In the ink ejection system of the printing head, any known type, such as piezo type or the like, can be employed. The most preferred mode is to generate a bubble in the ink or the treatment liquid utilizing thermal energy to eject the ink or the treatment liquid by the pressure of the bubble.

Furthermore, by each printing head, a range where the mixed ink and the treatment liquid are ejected to overlay each other, is normally controlled per pixel for forming the printed image, or so on. The foregoing ink or the like are ejected at the same position in an overlaying manner. However, the application of the present invention is not limited to the foregoing construction. For example, the present invention encompasses a construction in which a part of a dot of the mixed ink and the treatment liquid are overlaid to achieve the predetermined effect of the invention or a construction, in which the treatment liquid is applied for data of respective pixels with thinning to cause a reaction between the treatment liquid and the pigment or the like flowing from an adjacent pixel by bleeding or the like.

Second Practical Aspect

Another practical aspect of the present invention will be explained.

This practical aspect is intended to achieve high speed fixing by employing a treatment liquid having a high penetration ability.

High speed fixing is a major factor in achieving speeding up of the printing speed, thereby improving the throughput. By increasing the driving frequency of the printing head or the transporting speed of the printing medium, direct improvement of the throughput becomes possible. However, when the ink or the like on the printing medium discharged after printing is not yet fixed, inconvenience can be caused in subsequent handling. Also, where the discharged printing media are stacked, non-fixed ink on one recording medium may cause a stain of other printing media.

Among various factors contributing to speeding up of the printing speed, are the discharge speed of the printing medium after completion of printing, which depends on the feeding speed of the printing medium and the scanning speed of the printing head. In a printing apparatus employing a full-multi type printing head, the feeding speed of the printing medium in the printing operation directly corresponds to the discharge speed. In a printing apparatus employing a serial type printing head, the scanning speed is directly associated with the discharge speed of the printing medium after the completion of printing. Then, the feeding speed of the printing medium and so on is correlated with the ink ejection period for a pixel via a solution of printing problems, namely via the dot density. Therefore, in a printer performing printing of one pixel by the ink ejected from a plurality of printing head, when the resolution is considered to be fixed, the ejection period and the feeding speed, and so on, with respect to the pixel, is correlated.

In consideration of respective technical tasks relating to reaction of the dye ink and the pigment ink with the treatment liquid, it is preferred to make the period from ink ejection to ejection of the treatment liquid as long as possible. The reason is that, when the dye ink or the pigment ink reacts with the treatment liquid after penetration into the printing medium, the foregoing phenomena that diminish print quality will hardly occur. In other words, when printing is performed using a dye ink, a pigment ink and treatment liquid therefor, the foregoing long period from ink ejection to the ejection of the treatment liquid problem also interferes with speeding up of the printing speed. Particularly, when dye ink and pigment ink having a low penetration speed are used for achieving improvement of the OD value, the problem with interfering with the speeding up of printing becomes particularly significant.

According to one practical aspect of the invention, after the application of the mixed ink on the printing medium, by applying a treatment liquid having a high penetration speed, the advantageous effect set forth in the first practical aspect of the invention can be realized. Even if a mixed ink having a relatively low penetration speed is used, the penetration speed is increased by the associated high penetration speed treatment liquid. Namely, when the penetration speeds of the mixed ink and the treatment liquid with respect to the printing medium are $v_1$ and $v_2$ respectively, $v_1 < v_2$ is satisfied. In FIG. 4, this phenomenon is explained.

FIG. 4 shows the case where the mixed ink $I_m$ and the treatment liquid S are applied to the printing medium P in sequential order. In this case, a reaction product starts to be generated between the treatment liquid S and the mixed ink $I_m$ contacting each other at a boundary therebetween. The penetration speed of the mixture between the treatment liquid S and the mixed ink becomes higher than that of the case where the mixed ink is used alone. Thus, as a whole, by speeding up of the penetration speed to be higher than that in the mixed ink alone, high speed fixing becomes possible.

By using a treatment liquid having a high penetration speed, particularly when a mixed ink having a low penetration speed is used, for improving the OD value or the like, relatively high speed fixing can be achieved.

Third Practical Aspect

A still further practical aspect of the present invention relates to the order of application of the mixed ink and the treatment liquid. Namely, according to the practical aspect, after application of the mixed ink, the treatment liquid is applied, and thereafter, the mixed ink is further applied.

This aspect of the invention is particularly effective in improving the OD value, the restriction of "overflow", "blur" or feathering among the foregoing effects. Using a treatment liquid having a high penetration ability as the treatment liquid to be applied between applications of the mixed ink, a relatively high fixing ability can be obtained.

The foregoing function and effect of this practical aspect of the invention is achieved due to the reduced amount of fluidization caused in reaction between the initially applied mixed ink and the treatment liquid as a result of the relatively small amount of the mixed ink used. When the mixed ink is applied after the application of the treatment liquid, since the viscosity due to the reaction between the initially applied mixed ink and the treatment liquid increases to a certain extent and penetration of the ink and so on also progresses to a certain extent, flowability is lowered.

The ink to be applied after the application of the treatment liquid is preferred to be the mixed ink set forth above, but can be a self-dispersion type pigment ink or a dye ink According to a sixth aspect of the present invention, there is provided an ink-jet printing apparatus applying a first ink containing a coloring material to a printing medium, applying a treatment liquid for making the coloring material in the first ink insoluble and applying a second ink containing a coloring material, wherein the ink includes a pigment ink primarily containing a pigment as the coloring material and a dye ink primarily containing a dye as the coloring material, the apparatus comprising applying means for separately applying the pigment ink, the dye ink and the treatment liquid, and, on the printing medium, the pigment ink and the dye ink being mixed with the treatment liquid in a liquid state, respectively.

According to a seventh aspect of the present invention, there is provided an ink-jet printing apparatus applying one of a pigment ink containing a pigment as a primary coloring material and a dye ink containing a dye as a primary coloring material on a printing medium, thereafter applying a treatment liquid making the coloring material in the ink insoluble, and subsequently applying the other of the pigment ink and the dye ink onto the printing medium, comprising:

applying means for separately applying the pigment ink, the dye ink and the treatment liquid, and, on the printing medium, the pigment ink and the dye ink are mixed with the treatment liquid in a liquid state respectively.

According to an eighth aspect of the present invention, there is provided an ink-jet printing apparatus, having an ink ejecting portion ejecting an ink containing a coloring material, and a treatment liquid ejecting portion ejecting a treatment liquid making a coloring material in the ink insoluble, for performing printing by ejecting the treatment liquid after ejecting the ink toward a printing medium, the ink ejecting portion including a dye ejecting portion ejecting a dye ink primarily containing a dye as a coloring material and a pigment ejecting portion ejecting a pigment ink primarily containing a pigment as a coloring material, comprising:

ejecting portion arranging means for arranging the dye ink ejecting portion, the pigment ink ejecting portion and the treatment liquid ejecting portion in a predetermined positional relationship; and control means for relatively moving the ejecting portions arranged by the arranging means and the printing medium, ejecting the pigment ink, the dye ink, and the treatment liquid from the ejecting portions, and mixing the pigment ink, the dye ink, and the treatment liquid on the printing medium in a liquid state.

According to a ninth aspect of the present invention, there is provided an printing method performing printing by applying an ink containing a coloring material, and thereafter applying a treatment liquid making the coloring material in the ink insoluble, the ink including a pigment ink containing a pigment as a primary coloring material and a dye ink containing a dye as a primary color agent, comprising:

a step of separately applying the pigment ink, the dye ink and the treatment liquid onto the printing medium, mixing the pigment ink, the dye ink and the treatment liquid on the printing medium in a liquid state, at least the pigment ink, the dye ink and the treatment liquid being mixed in liquid state.

In the present invention, since the pigment ink, the dye ink and the treatment liquid are mixed on the printing medium, "crack" or "soaking out" which could be caused upon printing using the pigment ink and the treatment liquid, can be reduced by the simultaneously mixed dye ink. Conversely, lowering of the OD value or "overflow" which could be caused upon printing using only the dye and the treatment liquid can be compensated for or reduced by the simultaneously mixed pigment.

In the present invention, the treatment liquid is effective when the penetration speed is higher than or equal to 5.0 $(ml/m^2 \cdot sec^{1/2})$ in Ka value by the Bristow method. Upon printing with mixing the dye ink, the pigment ink, and the treatment liquid, in addition to the foregoing function, since the treatment liquid having a relatively high penetration ability is used, the reaction product of the pigment ink or the like and the treatment liquid also has a high penetration ability to speed up the penetration speed as a whole.

Fourth Practical Aspect

According to another practical aspect of the present invention, the dye ink and the pigment ink are mixed on the printing medium, and the treatment liquid is applied to the mixture of the dye ink and the pigment ink to form a dot by the reaction product.

FIGS. 5A to 5D are illustrations for explaining the formation of the dot. As shown in FIG. 5A, at first, the dye ink $I_d$ is applied to the printing medium. Then, as shown in FIG. 5B, the pigment ink $I_p$ is applied overlaying the dye ink $I_d$. Also, as shown in FIG. 5C, to the liquid, in which the dye ink $I_d$ and the pigment ink $I_p$ are mixed, the treatment liquid S is applied. Therefore, the reaction product, generated by reaction of the mixture liquid of the inks and the treatment liquid S, is fixed on the surface and inside of the printing medium P to form the dot, as shown in FIG. 5D.

According to this practical aspect of the invention, at first, the dye ink and the pigment ink are the mixed on the printing medium, and the mixed ink is used for printing. Therefore, lowering of the OD value caused by printing by the dye ink can be compensated for the pigment to enhance the OD value. Furthermore, the reaction product of the treatment liquid and the mixed ink stays in the upper layer portion of the printing medium in a large proportion to increase the OD value.

When the dye ink and the pigment ink having a low penetration speed are used, if the period to application of the treatment liquid is long to provide a long period for penetration, a large proportion of the coloring material may stay in the surface layer of the printing medium to enhance the OD value. In other words, by the effect of using both the dye ink and the pigment ink explained later, even if the ink having a low penetration speed is used, the problems that could be caused when the dye ink and the pigment ink are used alone, can be solved or reduced. Therefore, the dye ink or the pigment ink having an even lower penetration speed can be used. Thus, further increasing of the OD value can be expected. Furthermore, as an effect of using of ink having a low penetration speed, per se, so-called feathering can be restricted.

Secondly, in addition to the effect of improvement of the OD value set forth above, as the effect of printing by mixing the dye ink and the pigment ink on the printing medium, the problem of "crack" can be solved or reduced.

When the printing medium, such as plain paper or the like is used, the dye ink and the pigment ink are mixed on the printing medium, and subsequently, the treatment liquid is applied. The pigment may react with the treatment liquid to coagulate and to generate a block of the reaction product. In mutual gap between a plurality of blocks thus generated, the reaction product of the dye reacted with the treatment liquid is fluidized to penetrate therein for fill. Therefore, the occurrence of so-called "crack" set forth above can be prevented and restricted.

As the third effect of the practical aspect of the invention, in which the dye ink and the pigment ink are mixed on the printing medium and the treatment liquid is applied to the mixed inks, the problem of "overflow" or "sweep" that could be caused in printing by the dye ink and the problem of "soaking out" or "blur" that could be caused upon printing with the pigment ink containing no dispersant can be solved or reduced simultaneously.

According to the inventors, the principle achieving these effects can be explained as follow. After the application of the mixed ink onto the printing medium, the treatment liquid is applied. Then, the dye and the treatment liquid react to form a gel-form, high viscous substance. The pigment having no dispersant causes breakage of the dispersion by reaction with the treatment liquid. It is understood that the fine particles of the pigment generated by the dispersion breakage are taken into the high viscous substance of the dye reaction product to restrict "soaking out" or "blur" that could be caused by flowing out of the pigment particles. The high viscous substance absorbing the pigment particle has not too great a flowability in comparison with the reaction product of the dye alone and the treatment liquid. Accordingly, the occurrence of "overflow" or "sweep" can be suppressed simultaneously. Where the treatment liquid is applied to the mixture of the dye and the pigment having no dispersant, the fine particles of the pigment generated by dispersion breakage are taken in the gel-form reaction product so as not to deeply penetrate into the printing medium to bury a gap between the fibers of the printing medium in the surface layer. Then, the gel-form dye reaction product fills in the gap between the absorbed particles and the unevenness of the fibers on the surface of the printing medium. Therefore, irregular reflection of the light can be prevented to achieve an OD value higher than that achieved when the pigment and the treatment liquid are used.

According to one practical aspect of the invention, as diagrammatically illustrated in FIG. 5D, in conjunction with the restriction of the occurrence of a phenomenon, such as "blur" or "overflow", which could be a factor for degrading printing quality, the effect of increasing of the OD value and "crack" can be achieved as set forth as the foregoing first and second effects.

The phenomenon of "blur" or "overflow" can be caused by reacting the pigment ink or the dye ink with the treatment liquid before penetration into the printing medium. Therefore, in order to suppress the occurrence of these phenomena, it becomes necessary to apply the treatment liquid after waiting for penetration of the dye ink or the like, which interferes with the speeding up of the printing speed. However, according to this practical aspect of the invention, since "blur" or the like can be suppressed by the mixed ink per se, which is a mixture of the dye and the pigment ink having no dispersant, it becomes unnecessary to set a waiting interval for penetration of the dye ink or the like into the printing medium before applying the treatment liquid. Accordingly, speeding up of the printing speed will not be interfered with. In other words, the OD value can be further improved by using the mixed ink according to a practical aspect of the invention having a relatively low penetration ability so that the coloring material, such as the pigment or the like may stay in the surface layer of the printing medium for a long period.

In addition, in the ink-jet printing apparatus employing a full-multi type head, the interval from the application of the mixed ink to the application of the treatment liquid can be shorted to speed up the printing speed for the first one printing medium, known as the first print. Since the foregoing interval can be shortened, down-sizing of the apparatus and lowering of cost can be achieved.

The order of application of the mixed ink and the treatment liquid onto the printing medium according to a practical aspect of the invention is that the treatment liquid is applied after application of the mixed ink on the printing medium, as set forth above to attain the foregoing effect.

According to a study made by the inventors, among the foregoing orders of application, it has been appreciated that the sequential order of the pigment ink, the dye ink, and the treatment liquid or the sequential order of the dye ink, the pigment ink, and the treatment liquid are preferred. This is because the advantageous effect of mixing according to the present invention is most significant when the dye ink and the pigment ink are mixed to a certain extent and thereafter a reaction is caused with the treatment liquid.

Among two sequential orders set forth above, when the pigment ink, the dye ink and the treatment liquid are applied in this order, in addition of the advantageous effect set forth above, the effect of restricting so-called strike through can be achieved. Namely, deeper penetration of the coloring material of the dye or the like into the printing medium, called a strike through because the dot formed by this coloring material can be remarkably observed from the back side of the printing medium, can be caused. However, in the sequential order of application set forth above, substantially no strike through can be observed. The inventors suppose that for this reason for this is that since the pigment applied at an earlier timing has relatively large particles in the reaction product with the treatment liquid, the reaction product may be clogged in the gap between the fibers or the like of the printing medium, making it impossible to penetrate any further.

In the sequential order of application of the dye ink, the pigment ink and the treatment liquid, "overflow" or the like, which could be caused using the dye ink and the treatment liquid, is hardly caused.

Differences in the timings of the application of the mixed ink according to the invention and the treatment liquid may be encompassed within the scope of the present invention as long as the advantageous effect of the practical aspect of the invention can be achieved, similarly to the order of application set forth above.

For example, the timing difference of application of the pigment ink and the dye ink can be zero. Namely, the pigment ink and the dye ink may be applied to the printing medium simultaneously. Also, the interval from the application of the pigment ink or the like to the application of the treatment liquid is desired to include a time for mixing the pigment ink and the dye ink in order to obtain the advantageous effect of the practical aspect of the invention set forth above. However, even in a period shorter than the foregoing interval, in the peripheral portion of the dot formed by overlaying the pigment ink and the like, namely the edge portion, sufficient mixing of the pigment and the like can be caused to achieve the advantageous effects of the practical aspect of the invention. Particularly, at least the effect of suppression of "blur" or "overflow" can be achieved.

The color (kind), density and amount of the ink applied according to the practical aspect of the invention can be combined arbitrarily as long as the foregoing order of application is maintained. For example, as the kind of ink, black (Bk), yellow (Y), magenta (M) and cyan (C) inks are used generally. Concerning respective colors, high and low density inks may also be used. Further, with taking at least one of yellow ink, magenta ink and cyan ink as mixed ink according to the practical aspect of the invention, and using the treatment liquid, the mixed ink and the treatment liquid are applied in sequential order.

Among such combinations, to which the present invention is applicable, the most preferred mode is for the mixed ink to comprise black ink. With this mode, the advantageous effect of the invention, such as increasing of the OD value, and suppressing of "blur" or "overflow" contributes to the printing quality of characters, such as letters or the like.

In the foregoing explanation, the pigment ink and the dye ink have been explained as those containing only pigment and only dye as coloring material components, respectively, and the various effects set forth above can be achieved not only by the inks set forth above, but also by a pigment ink partly containing the dye or the dye ink partly containing pigment. This the true even for the following explanation. Therefore, in this disclosure, as the coloring material, ink containing the pigment only or ink containing the pigment partly containing dye are defined as "pigment ink containing the pigment as primary coloring material". Also, ink containing the dye only or ink containing the dye partly containing the pigment are defined as "dye ink containing the dye as primary coloring material".

As a method of applying these mixed inks and so on, to the printing medium, various methods, such as the application method or directly contacting the ink, or the like, to the printing medium, and so on, may be encompassed within the scope of the present invention. The most preferred type is the ink-jet printing type employing a printing head. Then, in this case, the combination and arrangement of the printing head or heads as the ejecting portion, is determined according to the combination of the application order and the kinds of ink and treatment liquid.

Particularly, by a construction, in which the heads for the mixed ink and the treatment liquid are aranged in a direction of relative movement of the printing head with respect to the printing medium, the foregoing sequential order of application becomes possible.

Furthermore, by each printing head, a range where the pigment ink, the dye ink and the treatment liquid are ejected to overlay, is normally controlled per pixel for forming the printed image, or so on. The foregoing ink or the like, are ejected at the same position in an overlaying manner. However, the application of the present invention is not limited to the foregoing construction. For example, the present invention encompasses a construction in which a part of a dot of the pigment ink, the dye ink and the treatment liquid are overlaid to achieve the predetermined effect of the practical aspect of the invention or a construction, in which the treatment liquid is applied for data of respective pixels with thinning to cause a reaction between the treatment liquid and the pigment, or the like, flowing from an adjacent pixel by bleeding or the like.

Fifth Practical Aspect

According to another practical aspect of the invention, by applying a treatment liquid having a high penetration speed after the application of the dye ink and the pigment ink onto the printing medium, the effect explained in the fourth practical aspect of the invention can be achieved. Also, even if dye ink and pigment ink having a relatively low penetration speed are used, the penetration speed can be made higher. According to this aspect of the invention, the penetration speeds of the pigment ink, the dye ink and the treatment liquid relative to the printing medium are $v_1<v_3$ and $v_2<v_3$ assuming that the penetration speed of the pigment ink is $v_1$, the penetration speed of the dye ink is $v_2$ and the penetration speed of the treatment liquid is $v_3$.

FIG. 6 shows the case where the pigment ink $I_p$, the dye ink $I_d$ and the treatment liquid S are applied on the printing medium P in the sequential order, and shows a condition where the treatment liquid S is applied at a timing where the pigment ink $I_p$ and the dye ink $I_d$ are not mixed sufficiently. In this case, the reaction product is generated at the boundary where the treatment liquid S and the dye ink $I_d$ contact. At first, since the penetration speed of the treatment liquid S is high, the reaction product may penetrate at a higher speed than that when the dye ink is used alone. Since the reaction between the dye and the treatment liquid per se is relatively small, the treatment liquid S further penetrates during reaction to also react with the pigment ink $I_p$ to make the penetration speed of the reaction product higher. Thus, as a whole, the penetration speed can be higher than the penetration speed in the case where the pigment ink and the dye ink are used alone to permit a high speed fixing.

According to this practical aspect of the invention, by using a treatment liquid having a high penetration speed, even if a pigment ink and dye ink having a low penetration speed are used for improvement of the OD value and so on, fixing at a relatively high speed becomes possible.

Sixth Practical Aspect

Another practical aspect of the present invention concerns the order of application of one of the pigment ink, the dye ink and the treatment liquid. Namely, after the application of the dye ink or the pigment ink, the treatment liquid is applied, and subsequently, the other of the pigment ink and the dye ink is applied. More particularly, the application of elements is performed in the order of the dye ink, the treatment liquid and then the pigment ink, or in the order of the pigment ink, the treatment ink and then the dye ink.

According to this aspect of the invention, in comparison with the aspect in which the treatment liquid is applied after the application of both of the pigment ink and the dye ink, the flow ability of the reaction product generated by the reaction between the ink and the treatment liquid is lowered, which is advantageous in the prevention of "overflow" and "sweep".

According to the present invention, since the pigment ink, the dye ink and the treatment liquid are mixed on the printing medium, "crack" or "soaking out", which could be caused when printing is performed only with the pigment ink and the treatment liquid, can be reduced by the presence of the simultaneously mixed dye ink. Conversely, lowering of the OD value or "overflow", which could be caused when printing is performed only by the dye and the treatment liquid, can be compensated for by the presence of the simultaneously mixed pigment ink and thus can be reduced.

As a result, high quality printing can be performed with a high OD value and by avoiding phenomena such as "crack", "soaking out", "overflow", and so on.

In addition to the effect to be achieved by printing with mixing the pigment ink and the treatment liquid, since the treatment liquid having a relatively high penetration ability is used, the reaction product of the pigment ink and the treatment liquid may have a high penetration ability to make the penetration speed high as a whole.

As a result, the fixing speed can be made higher to enable high speed printing.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 1A to 1D are illustrations for predictively explaining the "overflow" phenomenon of the reaction product upon reaction of a dye ink and a treatment liquid therefor;

FIGS. 2A to 2C are illustrations for predictively explaining the "soaking out" phenomenon of a reaction product upon the reaction of a pigment ink and a treatment liquid therefor.

DETAILED DESCRIPTION OF THE PREFERRED EMBODIMENT

Particular embodiments of the foregoing practical aspects will be explained hereinafter with reference to the drawings.

First Embodiment

Figure 3A:
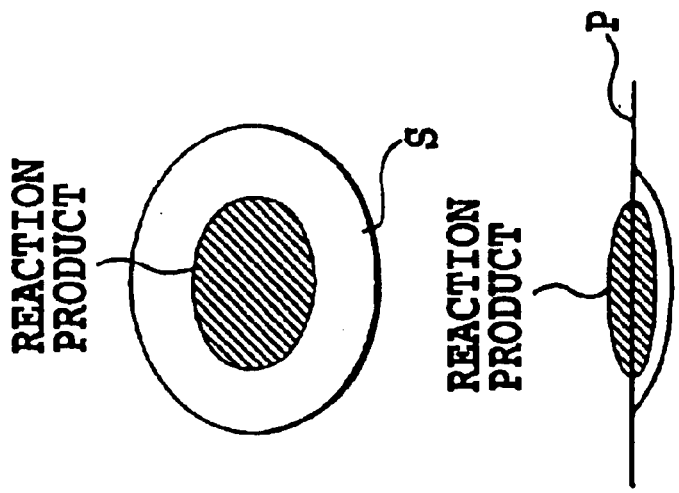
FIGS. 3A to 3C are illustrations for predictively explaining dot formation upon reaction with a treatment liquid after the application of an ink, in which both of a no dispersant containing pigment and a dye are mixed, according to one practical aspect of the present invention.
Figure 3B:
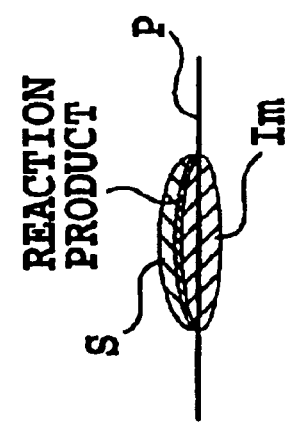
Figure 3C:
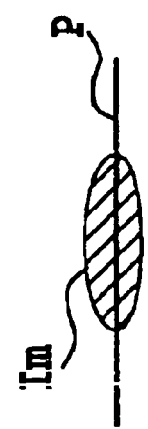
Figure 4:
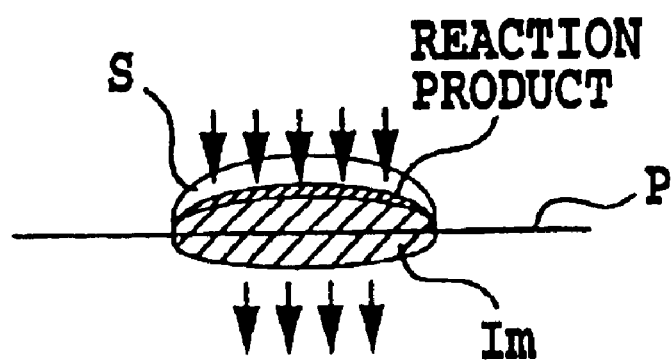
FIG. 4 is an illustration to explaining a reaction and a penetration with a mixed ink when a high penetrative treatment liquid is used as the treatment liquid according to another practical aspect of the present invention.
Figures 5A, 5B, 5C, 5D:
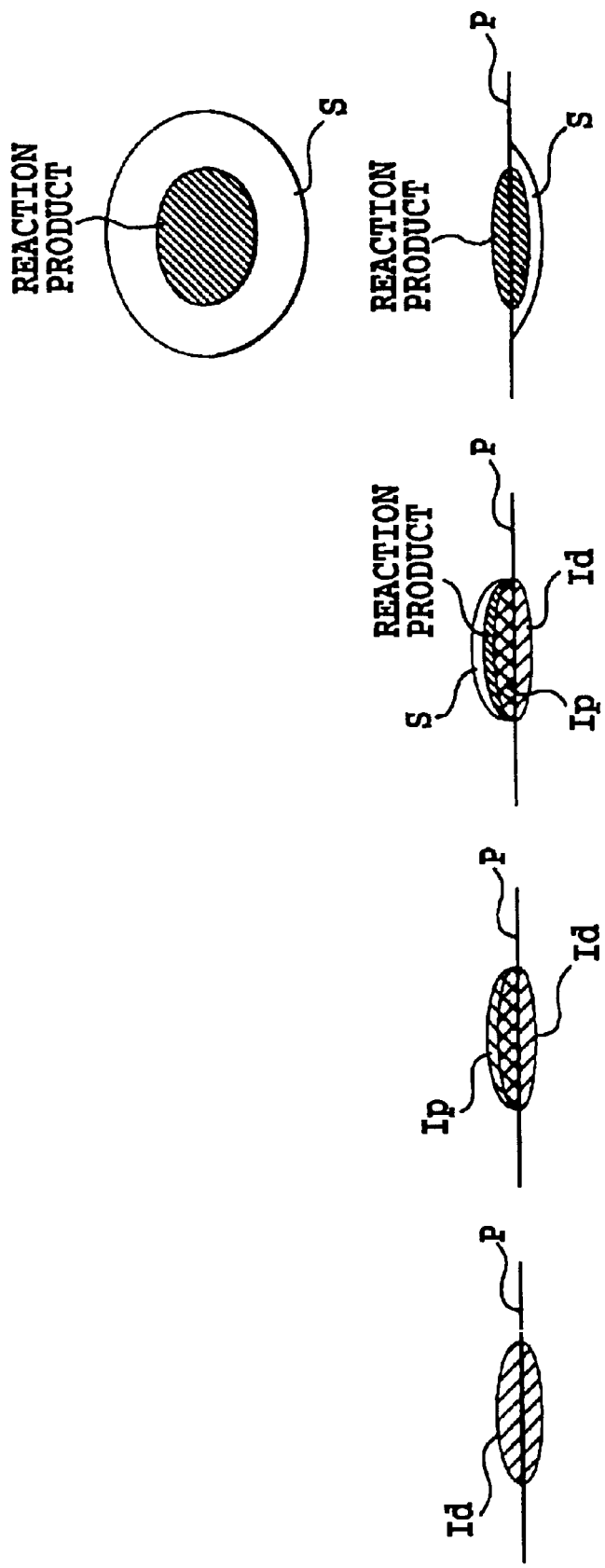
FIGS. 5A to 5D are illustrations for predictively explaining a reaction with the treatment liquid after mixing of the pigment ink and the dye ink on the printing medium according to another practical aspect of the present invention.
Figure 6:
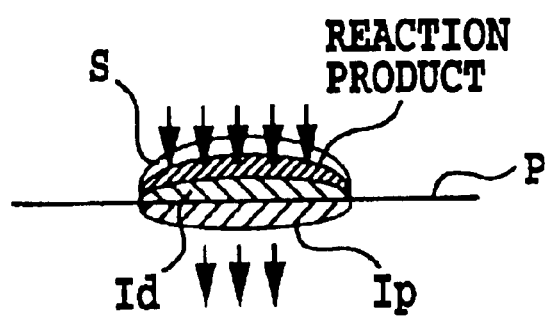
FIG. 6 is an illustration for explaining a reaction and a penetration with the pigment ink and the dye ink when a high penetrative treatment liquid is used as the treatment liquid, according to a further practical aspect of the present invention.
Figure 7:
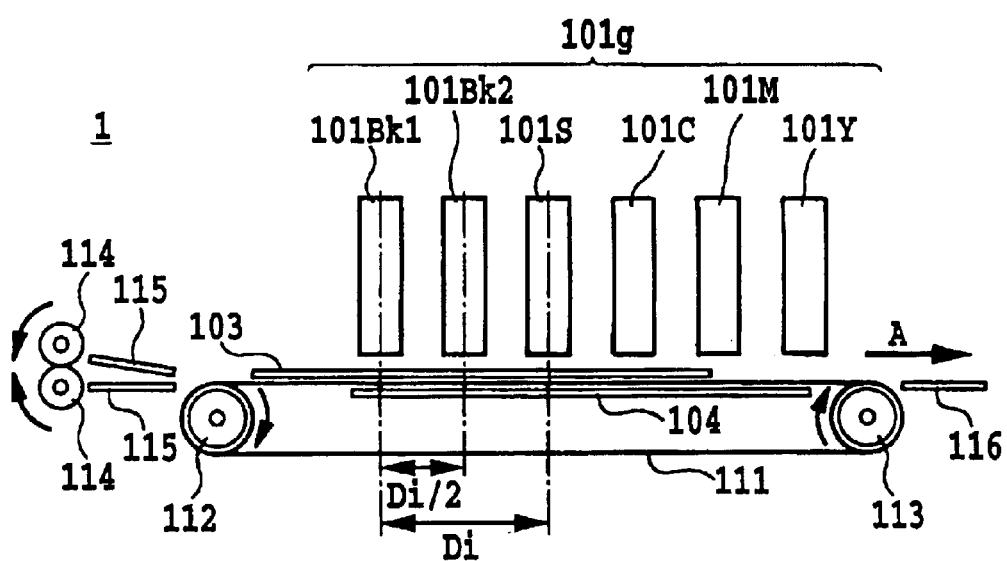
FIG. 7 is a side elevation showing the general construction of one embodiment of a printing apparatus according to the present invention.

FIG. 7 is a side elevation showing the general construction of one embodiment of a full-line type printing apparatus according to the present invention.

A shown printing apparatus 1 employs an ink-jet printing type apparatus performing printing by ejecting ink and a treatment liquid by a plurality of full-line type printing heads as an ejecting portion arranged at predetermined positions along a feeding direction of a printing medium (a direction of arrow A in FIG. 1). The shown printing apparatus 1 is operated under control by a control circuit shown in FIG. 8, which will be explained later.

Respective printing heads 101Bk1, 101Bk2 101S, 101C, 101M and 101Y of ahead group 101g can perform printing for a printing paper of maximum A3 size by arranging about 7200 ink ejection openings in a width direction (perpendicular direction of the paper surface of FIG. 7) of the printing paper fed in the direction A in FIG. 7.

The printing paper 103 is fed in the direction A by rotation of a pair of registration rollers 114 which are driven by a motor for feeding. Then, a tip end of the printing paper 103 is registered as guided by a pair of guide plates 115. Thereafter, the printing paper 103 is fed by a feeding belt 111. The feeding belt 111 as an endless belt is held by two rollers 112 and 113. Deflection of the upper side portion of the feeding belt 111 in a vertical direction is restricted by a platen 104. By driving the roller 113 for rotation, the printing paper 103 is fed. Suction of the printing paper 103 onto the feeding belt 111 is performed by electrostatic suction. The roller 113 is driven to rotate by a driving source, such as a motor for rotation to feed the printing paper 103 in the direction of arrow A. While the printing paper 103 is fed on the feeding belt 111, the printing paper 103 printed by the printing head group 101g is ejected on a stacker 116.

Each printing head of the printing head group 101g consists of two heads 101Bk1 and 101Bk2 ejecting the mixture ink of black color as set forth in the foregoing practical aspect of the invention, a head 101S for a treatment liquid ejecting the treatment liquid, and heads for color inks (cyan head 101C, magenta head 101M, yellow head 101Y), arranged as shown along the feeding direction A of the printing paper 102. Then, by ejecting the respective ink and the treatment liquid through the printing head, a character of a black or a color image can be printed.

Figure 8:
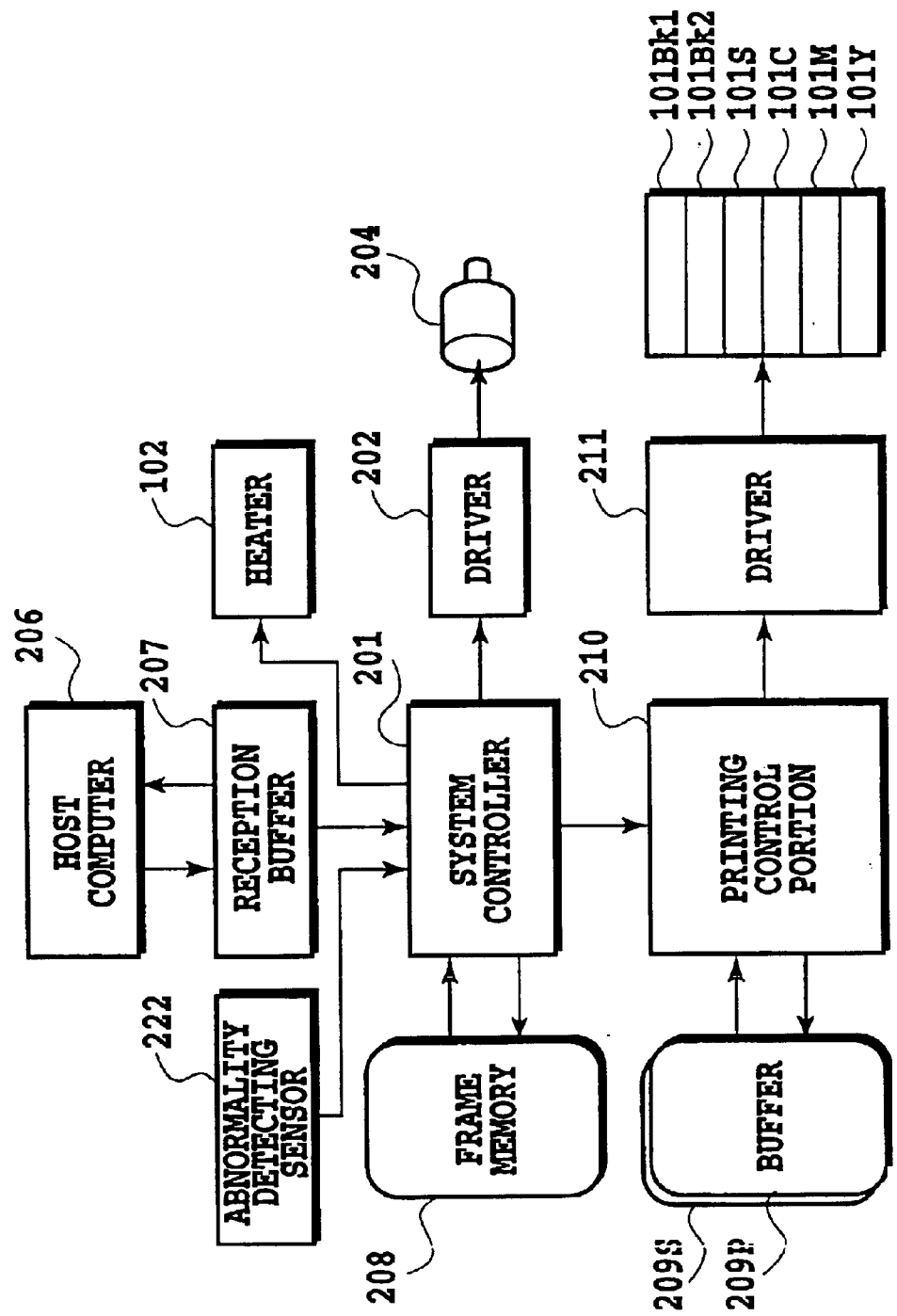
FIG. 8 is a block diagram showing the construction of a control system of the printing apparatus shown in FIG. 7.

FIG. 8 is a block diagram showing a construction of a control system in the full-line type printing apparatus 1 shown in FIG. 7.

A system controller 201 has a microprocessor, ROM storing a control program to be executed by the shown apparatus, RAM to be used as a work area performing a process of the microprocessor, and so on, for performing control of the overall apparatus. The driving of a motor 204 is controlled via a driver 202 and the motor 204 is driven to rotate the roller 113 shown in FIG. 7 to feed the printing paper.

A host computer 206 transports information to be printed for this embodiment of the printing apparatus 1 to control the printing operation. A reception buffer 207 temporarily stores data from the host computer 206 for accumulating data until data is read in by the system controller 201. A frame memory 208 comprises memories for developing data to be printed into the image data and has a memory size necessary for printing. In this embodiment the frame memory 208 is designed for storing one printing paper. However, the present invention should not be limited by memory capacity.

The buffers 209S and 209P temporarily store data to be printed and varies the storage capacity depending upon the number of ejection openings of the printing head. A print control portion 210 is designed for appropriately control driving of the printing head by a command from the system controller 201, for controlling the driving frequency, the number of printing data and so on. The print control portion 210 also makes data for ejecting the treatment liquid. A driver 211 performs driving of the printing head 101S for ejecting the treatment liquid, and drives the printing heads 101Bk1, 101Bk2 101C, 101M and 101Y for respectively ejecting ink, and is controlled by a signal from the print control portion 210.

The print data from the host computer 206 is transferred to and temporarily stored in the reception buffer 207. Next, the stored print data is read out by the system controller 201 and is developed in the buffers 209S and 209P. Conditions such as plugging of the printer, depleting of the ink, an out-of-paper condition and so on, can be detected by various detection signals from an abnormality detecting sensor 222.

The print control portion 210 performs generation of data for the treatment liquid in order to eject the treatment liquid on the basis of the image data developed in the buffers 209S and 209P. Then, on the basis of the print data and the treatment liquid data in respective buffers 209S and 209P, the ejection operation of respective printing head is controlled.

In the shown embodiment, concerning mixed ink of black color ejected from the heads 101Bk1 and 101Bk2, an ink having a low penetration speed (hereinafter referred to as low penetrative ink) is used. The treatment liquid and respective inks of cyan, magenta and yellow to be ejected through respective printing heads 101S, 101C, 101M and 101Y are the treatment liquid and the inks having a high penetration speed (hereinafter referred to as high penetrative ink in the this embodiment).

Here, the penetration speed will be briefly explained hereinafter.

Expressing penetration ability of the ink by an ink amount V per 1 $m^2$, for example, it has been known that an ink penetration amount (unit: $ml/m^2 = \mu m$) in a period t from ejection of the ink droplet is expressed by the following Bristow formula:

$$V = Vr + Ka(t-tw)^{1/2}$$

wherein Lt>tw

Immediately after deposition of the ink droplet on the surface of the printing paper, the ink droplet is mostly accommodated in an uneven portion of the surface of the printing paper, namely a rough portion of the surface of the printing paper and a little amount of the ink is penetrated into the printing paper. This period is a period tw (contact time) and an accommodated amount to be accommodated in the uneven portion of the surface of the printing paper is indicated by character Vr. When the elapsed time after deposition of the ink droplet onto the surface of the printing paper exceeds the wet time tw, the penetration amount V is increased in an amount proportional to (½)th power of the exceeding period (t–tw). Ka is a proportional coefficient of the increased component and becomes a value corresponding to the penetration speed.

Figure 9:
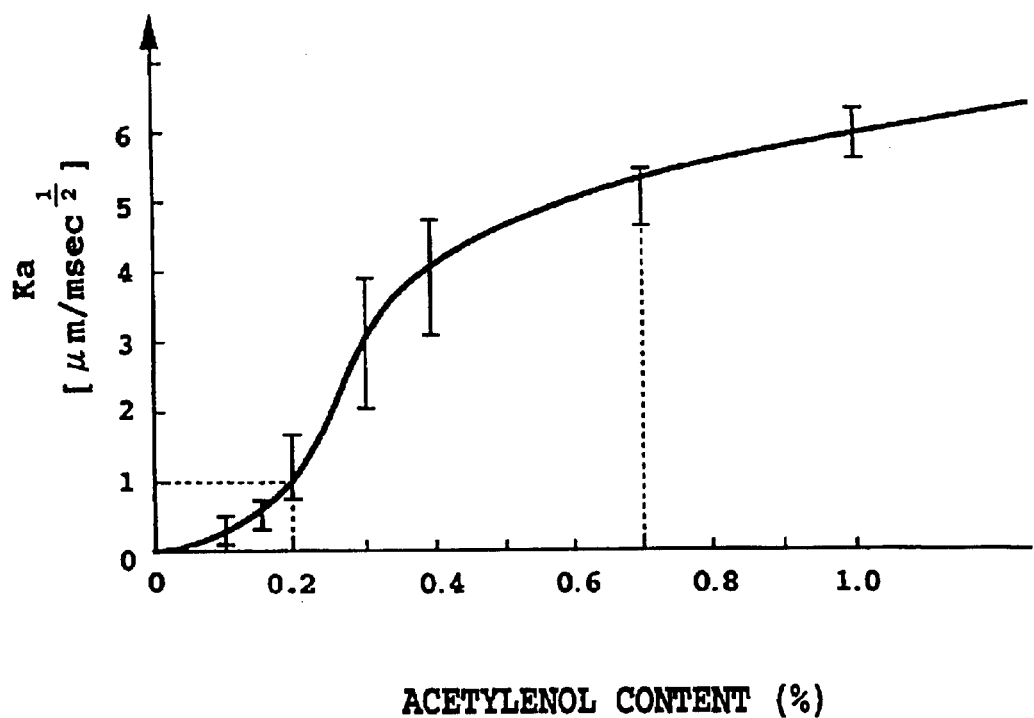
FIG. 9 is a diagrammatic illustration showing the relationship between the acetylenol content and the Ka value indicative of penetration speed.

FIG. 9 is an illustration showing a value of the proportional coefficient Ka with respect to a content of ethylene oxide-2,4,7,9-tetramethyl-5-decyne-4,7-diol (hereinafter referred to as acetylenol: tradename, available from Kawaken Fine Chemical) in the ink, obtained through experiments.

The Ka value was measured by means of a dynamic penetration testing device S (made by Toyo Seiki Seisakusho). In this experiment, a PB paper (tradename) as a plain paper available from Canon Kabushiki Kaisha as applicant of the present invention has been used. The PB paper is a printing paper to be used in an electrophotographic type copy machine, a laser beam printer (LBP) and an ink-jet printing type printer.

Also, for a PPC sheet as a paper for electrophotography available from Canon Kabushiki Kaisha, a similar result could be obtained.

A curve shown in FIG. 9 is a curve of increasing Ka value (vertical axis) according to an increasing of the acetylenol content (horizontal axis). As can be appreciated from this, the proportional coefficient Ka is determined depending upon the content of acetylenol. Therefore, the penetration speed of the ink is determined substantially depending upon the content of the acetylenol. Lines parallel to the vertical axis and intersecting with the curve represent ranges of fluctuation of the measurement result.

Figure 10A:
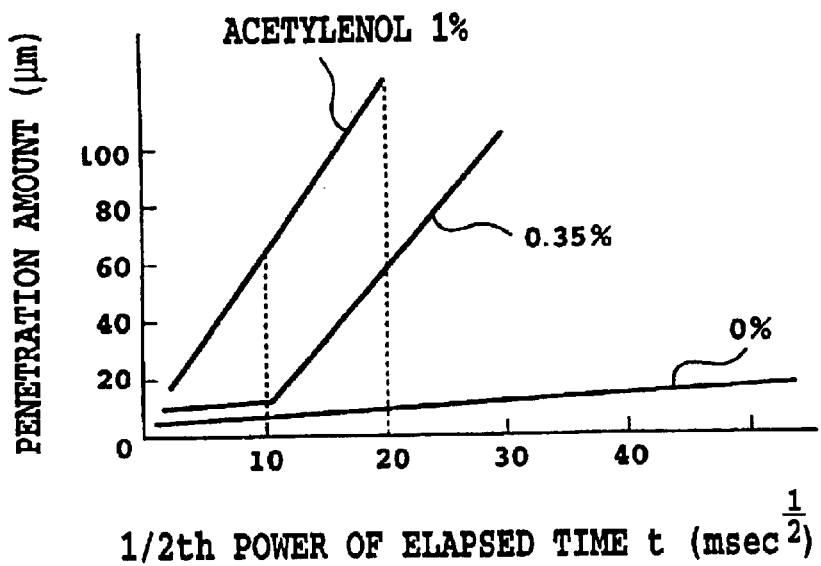
FIGS. 10A and 10B are characteristic charts each showing the relationship between the ink penetration amount and the elapsed period.
Figure 10B:
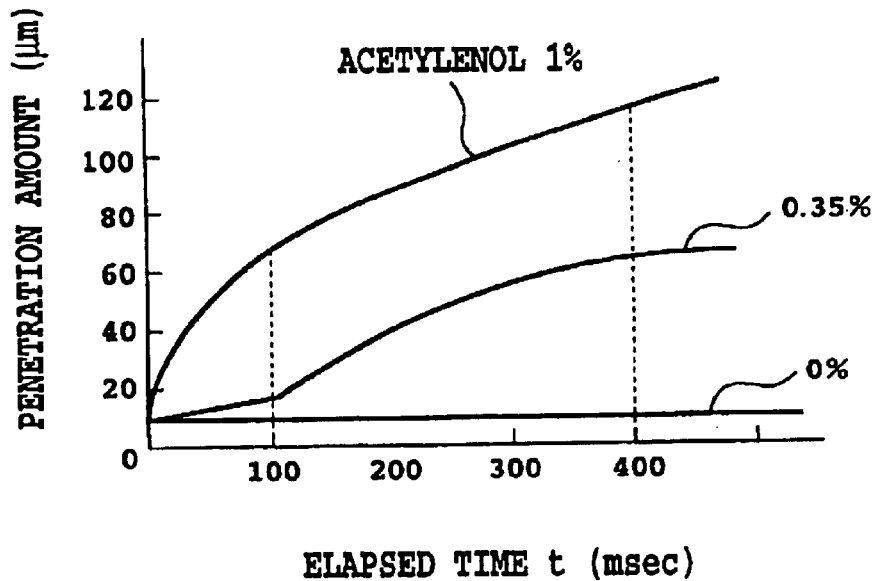

FIGS. 10A and 10B are characteristic charts showing a relationship between the ink penetration amount and the elapsed time, in which are shown the results of experiments performed using a printing paper of 64 g/m$^2$, having a thickness about 80 μm and a void fraction about 50%.

In FIG. 10A, the horizontal axis represents (½)th power of the elapsed time t (msec$^{1/2}$), and in FIG. 10B, the horizontal axis represents the elapsed time t (msec). In both figures, the vertical axes represent the penetration amount V (μm). In FIGS. 10A and 10B, curves of the cases of acetylenol contents of 0%, 0.35% and 1% are shown, respectively.

As can be clear from FIGS. 10A and 10B, the penetration amount of the ink relative to the elapsed period becomes greater at a greater content of the acetylenol. In the graphs shown in FIGS. 10A and 10B, there are illustrated tendencies that the wet time tw becomes shorter at the greater content of the acetylenol and the ink penetration ability becomes higher at a greater content of acetylenol.

When acetylenol is not mixed in an ink, namely when the acetylenol content is 0%, the ink penetration ability is low to have a property as low penetrative ink, which will be defined later. When acetylenol is mixed in to have a content of 1%, the ink has a property to penetrate into the printing paper in a short period, and has a property as a high penetrative ink. Then, the ink, in which acetylenol is mixed in an amount of 0.35%, has a property of semi-penetrative ink between the low penetrative ink and the high penetrative ink.

Properties of the foregoing low penetrative ink, the high penetrative ink and the semi-penetrative ink there between are shown in the following table 1.

The foregoing table 1 shows the Ka value, the acetylenol content (%) and the surface

TABLE 1

| | Ka Value (ml/m$^2$ · msec$^{1/2}$) | Acetylenol Content (%) | Surface Tension (dyne/cm) |
|---|---|---|---|
| Low penetrative ink | <1.0 | <0.2 | 40≦ |
| Semi-Penetrative Ink | 1.0 ≦ < 5.0 | 0.2 ≦ < 0.7 | 35 ≦ < 40 |
| High Penetrative Ink | 5.0≦ | 0.7≦ | <35 | tension (dyne/cm) of the respective low penetrative ink, the semi-penetrative ink, and the high penetrative ink, respectively. The penetration ability of the respective ink for the printing paper as the printing medium becomes higher at a greater Ka value. Namely, the penetration ability of the ink becomes higher at a smaller surface tension.

In the table 1, the Ka value has been measured by the dynamic penetration test device S (made by Toyo Seiki Seisakusho) of the liquid (by the foregoing Bristow method). In the experiments, the PB paper available from Canon Kabushiki Kaisha as applicant of the present invention has been used. Also, for the PPC paper as a paper for electrophotography available from Canon Kabushiki Kaisha, a similar result could be obtained.

Here, as a condition in the case where the surface-active agent is contained in a certain liquid, it has been known that there is a critical micell concentration (CMC) of the surface-active agent in the liquid. The critical micell concentration represents a concentration when a concentration of a solution of the surface-active agent is elevated abruptly causing a gathering of several tens of molecules to form a micell. Acetylenol contained for adjustment of penetration of the ink set forth above is a kind of surface-active agent. Even in acetylenol, the critical micell concentration is present depending upon the liquid.

As a relationship with the surface tension in the case where acetylenol content is adjusted, there is a relationship that when a micell is formed, the surface tension may not be lowered. Then, it has been confirmed that the CMC of acetylenol with respect to water is about 0.7%.

Making the critical micell concentration shown in FIGS. 10A and 10B correspond to the foregoing table 1, for example, the high penetrative ink defined in the foregoing table 1 is appreciated as the ink containing acetylenol at a higher content than that of the CMC of acetylenol in water.

Compositions of the treatment liquid and respective inks to be used in this embodiment are as follows:

| | |
|---|---|
| glycerin | 7 Wt. % |
| diethylene glycol | 5 Wt. % |
| acetylenol EH | 0.7 Wt. % |
| (made by Kawaken Fine Chemical) | |
| polyarylamine | 0.4 Wt. % |
| (molecular weight: 1500 and less, medium molecular weight: about 1000) | |
| ethanoic acid | 4 Wt. % |
| Benzalkonium chloride | 0.5 Wt. % |
| triethylene glycol monobutylether | 3 wt % |
| water | remainder |
| C. I. direct yellow 86 | 3 Wt. % |
| glycerin | 5 Wt. % |
| diethylene glycol | 5 Wt. % |
| acetylenol EH | 1 Wt. % |
| (made by Kawaken Fine Chemical) | |
| water | remainder |
| C. I. direct acid red 289 | 3 Wt. % |

-continued

| | |
|---|---|
| glycerin | 5 Wt. % |
| diethylene glycol | 5 Wt. % |
| acetyleol EH | 1 Wt. % |
| (made by Kawaken Fine Chemical) | |
| water | remainder |
| C. I. direct blue 199 | 3 Wt. % |
| glycerin | 5 Wt. % |
| diethylene glycol | 5 Wt. % |
| acetylenol EH | 1 Wt. % |
| (Kawaken Fine Chemical) | |
| water | remainder |
| pigment dispersion liquid | 25 Wt. % |
| food black 2 | 2 Wt. % |
| glycerin | 6 Wt. % |
| trietylene glycol | 5 Wt. % |
| acetylenol EH | 0.1 Wt. % |
| (made by Kawaken Fine Chemical) | |
| water | remainder |

The Ka value of this mixed ink of black color is 0.33. The above pigment dispersion liquid is as follow.

In a solution prepared by mixing 5 g of concentrated hydrochloric acid in 5.3 g of water, 1.58 g of anthranilic acid was added at a temperature of 5° C. The solution was stirred in an ice bath to be constantly maintained at a temperature lower than or equal to 10° C. Then, a solution prepared by dissolving 1.78 g of antrium nitrile in 8.7 g of water at a temperature of 5° C., was added. Furthermore, after stirring for 15 minutes, 20 g of carbon black having a surface area of 320 m²/g and DBP oil absorption of 120 ml/lOOg is added in the mixed condition. Then, further stirring was performed for 15 minutes. The obtained slurry was filtered by Toyo Roshi No. 2 (made by Advantice Co.). Then, a pigment particle was washed sufficiently and dried in an oven at a temperature of 110° C. Thereafter, by adding water to the pigment, a pigment solution having a pigment concentration of 10 Wt. % was prepared. Therefore, a pigment dispersion liquid, in which a self-dispersion type carbon black was charged to have an anion property and coupled with an hydrophilic radical via a phenyl radical on the surface, is expressed by the following chemical formula:

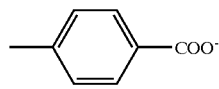

As can be clear from the respective composition set forth above, depending upon the content of acetylenol, the pigment ink and the dye ink of black color are set as low penetrative ink and the treatment liquid and respective inks of C, M, Y are set as high penetrative ink, respectively.

Concerning the pigment ink of black color, as explained in the foregoing practical aspect of the invention, the pigment ink, not using the dispersant, namely, no dispersant pigment ink, is used. In this ink, as an anionic carbon black dispersing element, a self-dispersion type carbon black dispersing element, in which at least one kind of hydrophilic radical is coupled on the surface of the carbon black directly or via another atomic group, is preferred for use. As a self-dispersion type carbon black, one having ionicity is preferred, and one charged to have an anionic property is preferred.

When carbon black is charged to have an anionic property, the hydrophilic radical to be coupled with the surface of carbon black may be —COOM, —SO₃M, —PO₃HM, —PO₃M₂, —SO₂NH₂, —SO₂NHCOR and so on (wherein M represents one of a hydrogen atom, an alkali metal, ammonium and organic ammonium, R represents an alkyl radical having a carbon atom in a range of 1 to 12, a phenyl radical which may have a substituent group, or a naphthyl radical which may have a substituent group), for example. In this embodiment, it is especially preferred to use those charged to have an anionic property with coupling —COOM or SO₃M on the surface of the carbon black.

"M" in the hydrophilic radical may be alkali metal such as lithium, sodium, potassium or the like. Alternatively, the hydrophilic radical may be organic ammonium such as mono-, di-, or tri-methyl ammonium, mono to triethyl ammonium, or mono-, di-, or tri-methanol ammonium.

As a method for obtaining carbon black charged to have an anionic property, such as for linking —COONa on the surface of carbon black, for example, a method for oxidizing carbon black with hydrochlorite soda can be considered. Of course, the present invention is not limited to these.

In this embodiment, it is preferred to use carbon black, on the surface of which a hydrophilic radical is coupled with other atom group. As another atom group, an alkyl group having a carbon atom in a range of 1 to 12, a phenyl radical, which may have a substituent group, or naphthyl, which may have a substituent group, may be used. In addition to the foregoing example, —C₂H₄COOM, —PhSO₃M, or —PhCOOM and so on (wherein Ph represents a phenyl radical) may be used. However, as a matter of course, the present invention is not limited to those exemplified above.

Carbon black, to the surface of which the anionic radical set forth above is bound directly or via another atom group may be prepared by the following method, for example.

Namely, as a method for introducing a —COONa radical on the surface of carbon black, a method of performing an oxidation process for commercially available carbon black with hydrochlorite soda, for example, may be used. On the other hand, for example, as a method for binding an —Ar—COONa radical (wherein Ar represents an aryl radical) on the surface of carbon black, a method to bind diazonium prepared by acting nitrous acid to an NH₂—Ar—COONa radical on the surface of the carbon black, may be used. However, as a matter of course, the present invention should not be limited to these methods.

In the self-dispersion type pigment to be contained in the ink of this embodiment, it is preferred that 80% or more of the particles thereof have a particle size within a range of 0.05 to 0.3 μm, and more particularly within a range of 0.1 to 0.25 μm. A method of preparation of such ink is as explained in the foregoing embodiment.

Carbon black in the no dispersant pigment ink per se does not require the addition of pigment dispersion resin or a surface-active agent to attain superior water dispersion ability in comparison with conventional carbon black. Therefore, in comparison with the conventional pigment ink, the carbon black set forth above is advantageous in higher fixing ability, higher wetting ability and so on. Thus, such carbon black is superior in reliability as used in the printing head.

By using the mixture ink of black color in this embodiment, for a liquid, in which carbon particulate and black dye charged at the same polarity are mixed and dispersed, the treatment liquid containing a different polarity of high molecular is reacted.

In this embodiment, the ink ejection openings in each printing head are arrayed in a density of 600 dpi. In the feeding direction of the printing paper, printing is performed at a dot density of 600 dpi in the feeding direction of the printing paper. Therefore, the dot density of the image or the like to be printed in the embodiment is 600 dpi in both of row direction and column direction. The ejection frequency of a respective dot is 4 KHz. Accordingly, the feeding speed of the printing paper becomes about 170 mm/sec. Furthermore, the distance $D_i$ between the heads 101Bk1 and 101Bk2 of the mixed ink and the treatment liquid of the head 101S (see FIG. 7) is 80 mm. Accordingly, the period from ejection of the pigment ink of black color to the ejection of the treatment liquid becomes about 0.48 sec. The ejection amount of each printing head is 15 pl per one ejection. Even when an interval from the ejection of the black ink Bk to the ejection of the treatment liquid S is set at 0.1 seconds, a substantially similar result of evaluation could be obtained.

Next, for effect and comparison concerning printing quality, and so on, upon performing printing for a predetermined image of black color by this embodiment, an explanation will be given using the following tables 2 and 3.

TABLE 2

| Evaluation Item | | System | | |
|---|---|---|---|---|
| | | Embodiment | Comparative Example 1 | Comparative Example 2 |
| OD Value | Average OD Value of Among Six Printing Papers | 1.50 | 1.40 | 1.37 |
| | Minimum OD Value of Among Six Printing Papers | 1.45 | 1.29 | 1.34 |
| Effective Timing of Water Resistance | | Immediately After Printing | Within 48 Hours | Immediately After Printing |
| Fixing Ability (Minimum Among Six Printing Papers) | | within 10 Sec. | About 80 Sec. | About 90 Sec. |

In the foregoing table 2, similarly this embodiment, both comparative examples show the case where the same predetermined image is printed at a resolution of 600 dpi. The first comparative example 1 is a system employing only one head ejecting the pigment ink in an amount of 30 pl per one ejection and not using the treatment liquid, and the second comparative example 2 is a system using a head ejecting a dye ink of black color in an amount of 30 pl per one ejection and a head ejecting the treatment liquid having relatively low penetration in an amount of 15 pl per one ejection. The embodiment and the comparative examples in the foregoing table 2 performing printing of the predetermined image on 6 kinds of mutually different printing papers and the table 2 shows the results of measurement of OD value and so on. Among evaluation items shown in the table 2, the OD value is measured using a Machbeth density measuring device. The timing, at which water resistance becomes effective, is not the timing where a disturbance of the image is hardly recognized when water is dripped after printing. Also, a fixing ability is a timing where set off is not caused upon discharging of the printed product.

As can be clear from the table 2, the system is particularly superior in OD value and fixing ability.

In this embodiment of the apparatus shown in FIG. 7, both of the black inks ejected from the heads 101Bk1 and 101Bk2 for black ink were the pigment inks in the case of the comparative example 3 and the dye inks in the case of the comparative example 4.

It can be appreciated that the embodiment exhibits superior OD value. Namely, concerning this OD value, in this embodiment where the treatment liquid is applied for the ink, in which the pigment requiring no dispersant and dye are mixed, the foregoing effect is achieved by mixing of the pigment ink and the dye ink to obtain a higher OD value than the case where the treatment liquid is applied to only pigment or only dye.

When a comparison is made in terms of suppression of feathering ("blur" or "soaking out") or restriction of lowering of sharpness (restriction of "overflow"), the embodiment exhibits a superior effect than the comparative examples.

Even when an interval from ejection of the black ink Bk to ejection of the treatment liquid S in table 3 is set as 0.1 seconds, a substantially similar result of evaluation could be obtained.

The full-multi type printing apparatus described above is used in a condition where the printing head is fixed during the printing operation. Therefore, the period required for feeding the printing paper substantially corresponds to the period required for printing. Thus, the present invention is suitable for high speed printing. Accordingly, by application of the present invention to the high speed printing apparatus, the high speed printing function can be further improved. Furthermore, in view of the OD value and the restriction of "soaking out", "overflow" and so on, high quality printing can be achieved.

While the embodiment of the printing apparatus is employed in a printer in the most typical case, the application is not limited to this but can be constructed as a printing portion of copy machine, facsimile and so on.

The effect of the embodiment explained with reference to tables 2 and 3 is not limited to the construction employing two heads with respect to black mixed ink but can be a construction employing a single head with an ejection amount of 30 pl.

Second Embodiment

Figure 11:
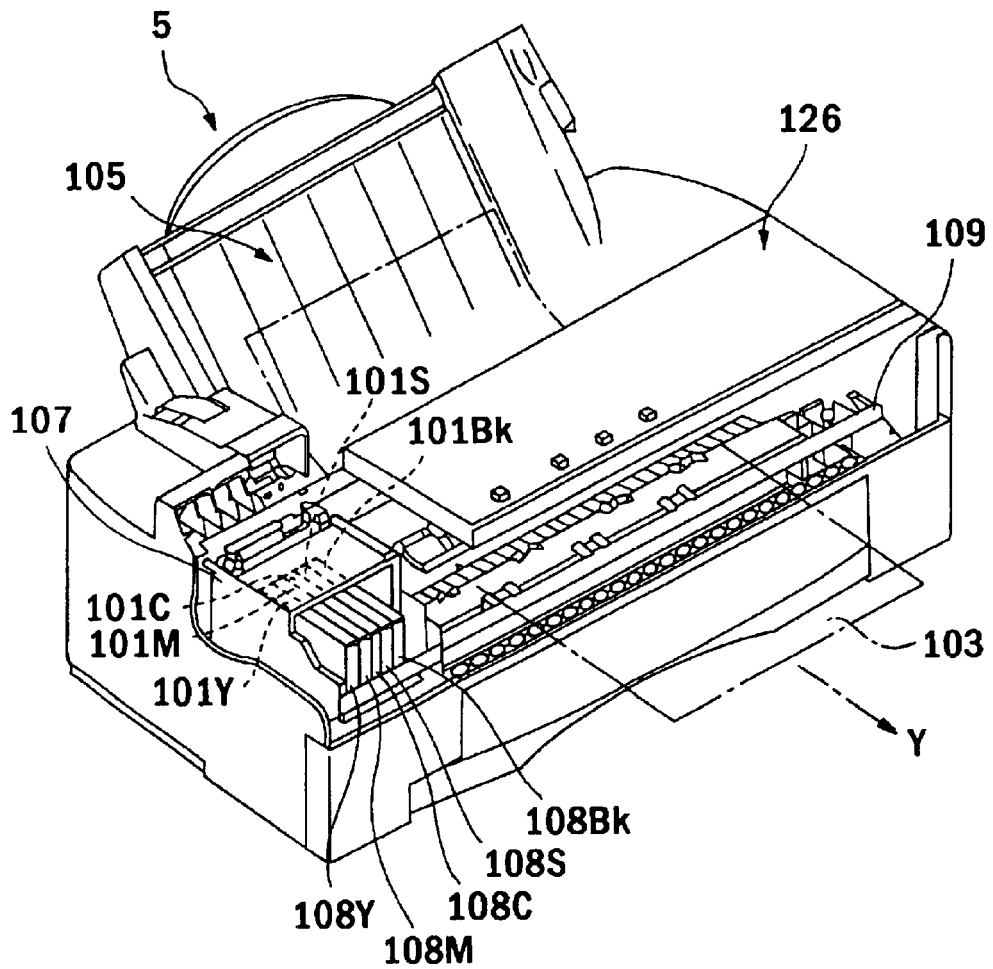
FIG. 11 is a perspective view showing the construction of another embodiment of the printing apparatus according to the present invention.

FIG. 11 is a general perspective view showing the construction of the second embodiment of a serial type printing apparatus 5 according to the present invention. Namely, the printing apparatus which ejects the treatment liquid after the application of the mixed ink on the printing medium for causing a reaction, is not limited to the full-line type but can be a serial-type apparatus. Similar elements to those illustrated in FIG. 7 will be identified by like reference numerals to avoid a detailed description thereof in order to avoid redundant disclosure and to keep the disclosure simple enough to facilitate clear understanding of the present invention.

The printing paper 103 as the printing medium is inserted from a paper feeding portion 105 and discharged through a printing portion 126. In the embodiment, generally widely used inexpensive plain paper is used as the printing paper 103. In the printing portion 126, the carriage 107 is constructed to mount the printing heads 101Bk, 101S, 101C, 101M and 101Y and to move reciprocally along the guide rail 109 by a driving force of the not shown motor. The printing head 101Bk ejects the mixed ink of black color discussed in the former embodiment. On the other hand, the printing heads 101S, 101C, 101M and 101Y respectively eject the treatment liquid, cyan ink, magenta ink and yellow ink and are driven in sequential order for ejecting the treatment liquid and inks.

To the respective heads, the ink and the treatment liquid are supplied from respectively corresponding ink tanks 108Bk, 108S, 108C, 108M and 108Y. Upon ink ejection, drive signals are supplied to electrothermal transducers namely heaters, provided for respective ones of the ejection openings of the respective heads, to thereby apply thermal energy to the ink and the treatment liquid for generating a bubble. The pressure upon bubbling is used to perform ejection of the inks and the treatment liquid. For each head, 64 ejection openings are arranged at a density of 360 dpi. These 64 ejection openings are arranged in alignment in the same direction as the feeding direction of the printing paper 103, namely in a substantially perpendicular direction to the scanning direction of each head. In the embodiment, the ejection amount per each ejection opening is set at 23 pl.

The distance between each individual head is ½ in. Accordingly, the distance between the heads 101Bk and 101S becomes 1 inch. Since the printing density in the scanning direction is 720 dpi and the ejection frequency of each head is 7.2 KHz, the period from ejection of the pigment ink of the head 101Bk to the ejection of the treatment liquid of the head 101S becomes 0.05 sec.

Figures 12A, 12B, 12C:
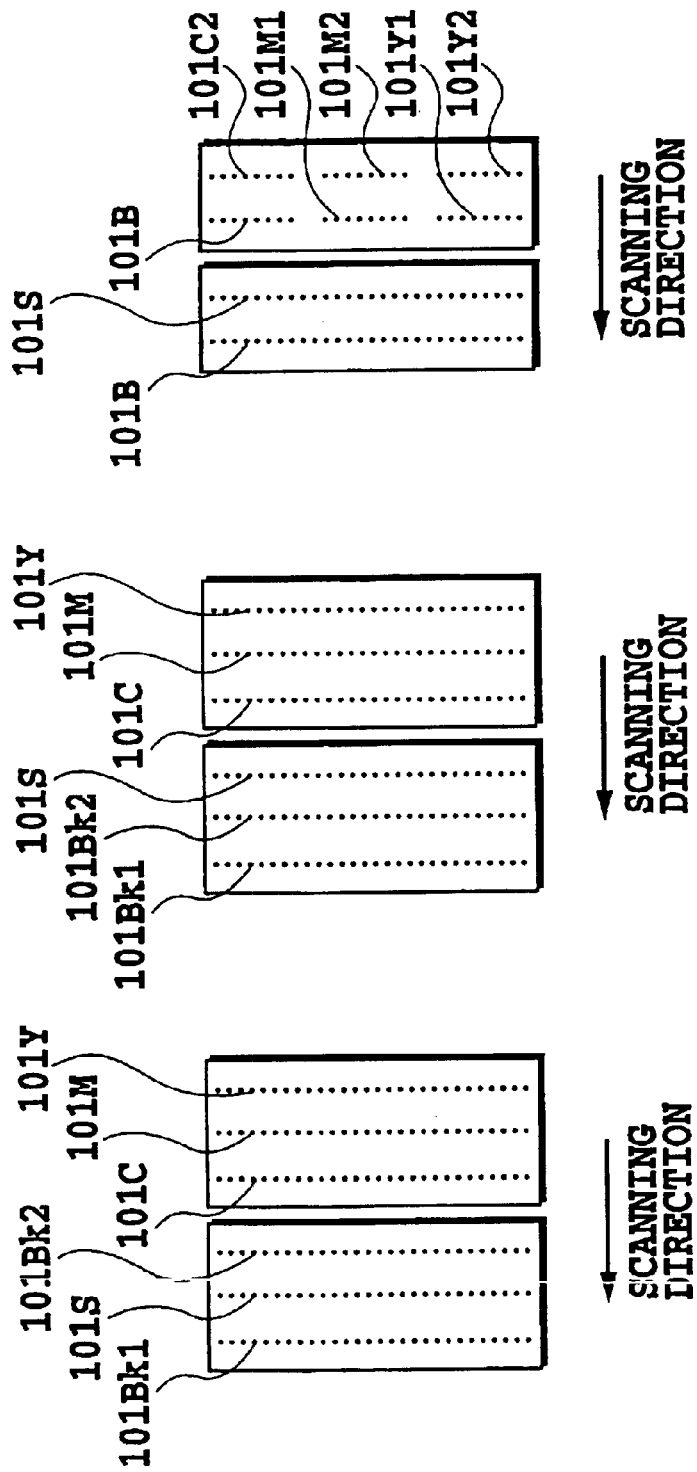
FIGS. 12A to 12C are diagrammatic illustrations showing a head construction of a further embodiment of the printing apparatus according to the present invention.

FIGS. 12A to 12C are diagrammatic illustration showing ejection opening arrays of other examples of a head construction in the serial printing apparatus shown in FIG. 11.

As shown in FIG. 12A, the head may be constructed to have two ejection portions (ejection portions 101Bk1 and 101Bk2) for ejecting black ink as the mixed ink, and the ejection portion 101S ejecting the treatment liquid is arranged therebetween. In this case, after the application of the mixed ink of black color, the treatment liquid is applied, and subsequently, the mixed ink of black color is further applied.

The head construction shown in FIGS. 12B and 12C as well as FIG. 12A, is constructed, in which the head construction for several inks or treatment liquid are integrated. Of course, in these head units of integral construction, the ejection openings per the inks or the treatment liquid or liquid chambers and so forth communicated thereto are mutually separated. Accordingly, each ejection portion is similar to the head of each ink or treatment liquid.

Similarly to FIG. 12A, FIG. 12B shows an example, in which two ejection openings eject black ink of the mixed ink. However, in this embodiment, the ejection portions 101Bk1 and 101BK2 for the mixed ink and the ejection portion for the treatment liquid are arranged so that the mixed ink is ejected through two ejection portions 101Bk1 and 101Bk2 in advance of ejection of the treatment liquid. With such a construction, after the deposition of two droplets of black ink of the mixed ink, the treatment liquid is applied.

FIG. 12C shows an example which is similar in arrangement and number to the embodiment shown in FIG. 11 in terms of the arrangement and number of the ejection portion 101Bk ejecting the mixed ink of the black ink and the ejection portion 101S ejecting the treatment liquid, and is differentiated in the construction of the ejection portions of respective of C, M and Y inks. The respective two ejection portions of respective of C, M, Y inks (ejection portions 101C1, 101C2, ejection openings 101M1, 101M2 and ejection portions 101Y1, 101Y2) are provided. The ejection portions 101C1, 101M1 and 101Y1 and ejection portions 101C2, 101M2 and 101Y2 are respectively arranged in a direction perpendicular to the scanning direction, per each ink. In this head construction, a plurality of scanning operations with feeding of the printing paper between each scan is effected for overlaying respective inks of C, M and Y. Two ejection portions of each ink, respectively eject high density and low density inks.

As shown in FIGS. 12A and 12B, when two ejection portions of the mixed ink of black ink are present, for example, the content of no dispersant pigment and the dye in the mixed ink to be ejected from respective ejection portions are the same in either ejection openings. However, the contents of no dispersant pigment and the dye in the mixed ink to be ejected from respective ejection portions may be differentiated. For example, the ratio of the pigment and the dye may be 3:7 in the ejection portion 101Bk1 and 7:3 in the ejection portion 101Bk2. Conversely, the ratio may be 7:3 in the ejection portion 101Bk1 and 3:7 in the ejection portion 101Bk2.

Third Embodiment

In further embodiment of the present invention, as shown in FIG. 12A, the printing head or ejection portion are arranged. Namely, in FIG. 12A, the mixed ink of black color is ejected from ejection portions 101Bk1 and 101Bk2, and the treatment liquid is ejected from the ejection portion 101S. Then, the mixed ink, the treatment liquid and the mixed ink are ejected in sequential order.

In this embodiment, in each ejection portion, the ejection openings are arranged at a density of 600 dpi. The ejection amount of each ejection opening is 15 pl. The interval between the ejection portions is 12 inch similarly to the foregoing, second embodiment. The ejection frequency is 10 KHz, and the resolution in printing is 600 dpi in both of the auxiliary scanning direction (paper feeding direction) and primary scanning direction (head scanning direction). Therefore, the interval of ejection of the mixed ink and the treatment liquid becomes 30 msec. The treatment liquid contains 0.7% of acetylenol to have a high penetrative property.

According to the construction of the embodiment, the OD value of printing of black character or the like as high as 1.5 or higher, can be obtained. Also, fluidizing of the reaction product by the treatment liquid is small, and "overflow" or feathering can also be prevented successfully. Since a high penetrative-type treatment liquid is used, a relatively high fixing ability can be achieved.

Fourth Embodiment

In the shown embodiment, the construction of the embodiment illustrated in FIGS. 7 and 8 is applied for the mode, in which the pigment ink and the dye ink are ejected individually instead of ejecting the mixed ink. In this case, the head 101Bk1 for the pigment ink of black color, the head 101Bk2 for the dye ink of black color, the head 101S for the treatment liquid ejecting the treatment liquid, and heads for color inks (cyan head 101C, magenta head 101M and yellow head 101Y) among printing heads of the printing head group 101g are arranged as shown along the feeding direction A of the printing paper 103. Then, by ejecting respective colors of inks and the treatment liquid through respective printing heads, printing of black characters or a color image is possible.

In this embodiment, the pigment ink and the dye ink of black color to be ejected through the heads 101Bk1 and 101Bk2 respectively, are low penetrative inks having a low penetration speed, and the treatment liquid and cyan, magenta and yellow inks to be ejected through the heads 101S, 101C, 101M and 101Y, respectively are high penetrative inks having a high penetration speed.

Among compositions of the inks to be used in this embodiment, compositions of the inks different from the former embodiment are as follows:

| | |
|---|---|
| food black 2 | 4 Wt. % |
| glycerin | 7.5 Wt. % |
| diethylene glycol | 7.5 Wt. % |

-continued

| | |
|---|---|
| urea | 7.5 Wt. % |
| water | remainder |
| pigment dispersion liquid | 50 Wt. % |
| glycerin | 7 Wt. % |
| triethylene glycol | 7 Wt. % |
| acetylenol EH (made by Kawaken Fine Chemical) | 0.2 Wt. % |
| water | remainder |

In the shown embodiment, no dispersant pigment ink, is used. In this ink, as an anionic carbon black dispersion element, a self dispersion type carbon black dispersion element, in which at least one kind of hydrophilic radical is coupled on the surface of the carbon black dispersion element via another atom group, is preferred to be used. As the self dispersion type carbon black, carbon black having ionicity, preferably one charged to have an anionic property is preferred.

By using the pigment and dye inks of black in the embodiment, for a liquid state, in which a carbon black particle and a black dye charged into the same polarity are mixed and dispersed, the treatment liquid having a high molecular of different polarity is reacted.

In this embodiment, a distance $D_j$ (see FIG. 7) between the head 101Bk1 of the pigment ink and the head 101S of the treatment liquid, is 80 mm. Accordingly, the period from ejection of the pigment ink of black color to the ejection of the treatment liquid is about 0.48 sec. It should be noted that the ejection amount of the printing head is 15 pl per one ejection.

Next, the effect relating to printing quality, or so on, upon performing printing for a predetermined image of black color by the embodiment and result of comparison will be explained using following tables 4 and 5.

As can be clear from the table 4, in the system of the embodiment, the OD value and the fixing ability are particularly superior.

TABLE 4

| | | System | | |
|---|---|---|---|---|
| Evaluation Item | | Embodiment | Comparative Example 1 | Comparative Example 2 |
| OD Value | Average OD Value of Among Six Printing Papers | 1.45 | 1.40 | 1.37 |
| | Minimum OD Value of Among Six Printing Papers | 1.41 | 1.29 | 1.34 |
| Effective Timing of Water Resistance | | Immediately After Printing | Within 48 Hours | Immediately After Printing |
| Fixing Ability (Minimum Among Six Printing Papers) | | Within 10 Sec. | About 80 Sec. | About 90 Sec. |

From this table, it can be appreciated that the embodiment is particularly superior in the OD value. Namely, concerning this OD value, when the treatment liquid is applied to the mixture of the pigment ink and the dye ink, such as in this embodiment, the foregoing effect is caused by mixing to achieve a higher OD value than the case where the treatment liquid is applied to only pigment ink or only dye ink.

Fifth Embodiment

Figure 13:
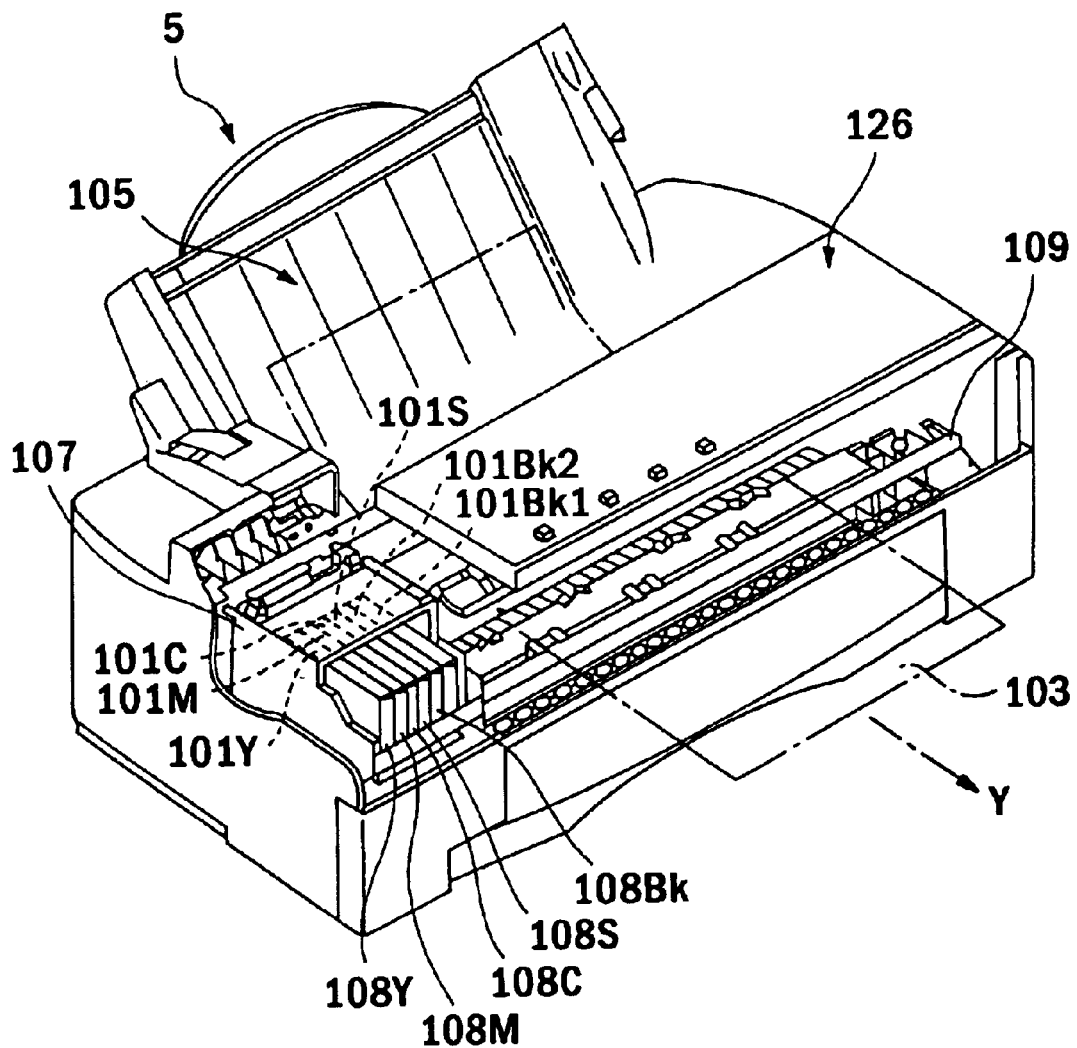
FIG. 13 is a perspective view showing the construction of a still further embodiment of the printing apparatus according to the present invention.

FIG. 13 is a general perspective view showing the fifth embodiment of the serial type printing apparatus according to the present invention. It is clear that the printer, in which the treatment liquid is reacted after mixing the dye ink and the pigment ink on the printing medium is applicable not only for the foregoing full-line type, but also to a serial type printing apparatus. Similar elements to those illustrated in FIG. 7 will be identified by like reference numerals to avoid a detailed description thereof in order to avoid redundant disclosure, to keep the disclosure simple enough to facilitate clear understanding of the present invention.

TABLE 5

| | | System | | |
|---|---|---|---|---|
| Evaluation Item | | Shown Embodiment (Mix) + (Mix) | Comparative Example 3 (Pigment) + (Pigment) | Comparative Example 4 (Dye) + (Dye) |
| OD Value | Average OD Value of Six Printing Papers | 1.45 | 1.40 | 1.38 |
| | Minimum OD Value of Six Printing Papers | 1.41 | 1.37 | 1.34 |
| Fixing Ability | | ○ | ○ | ○ |
| Restriction of Feathering (Blur or the like) | Period of Bk → S 0.48 sec. | ○ | X | X |
| | Period of Bk → S 1.9 sec. | ○ | X | X |
| Sharpness of Edge of | Period of Bk → S 0.48 sec. | ○ | X | X |
| Solid Printing | Period of Bk → S 1.9 sec. | ○ | X | X |

The printing paper 103 as the printing medium is inserted from the paper feeding portion 105 and discharged through the printing portion 126. In this embodiment, generally widely used inexpensive plain paper is used as the printing paper 103. In the printing portion 126, the carriage 107 is constructed to mount the printing heads 101Bk1, 101Bk2, 101S, 101C, 101M and 101Y and to move reciprocally along the guide rail 109 by a driving force of the not shown motor. The printing head 101Bk1 ejects the pigment ink of black color, and the printing head 101k2 ejects the dye ink of black color. The printing heads 101S, 101C, 101M and 101Y respectively eject the treatment liquid, cyan ink, magenta ink and yellow ink, are driven for ejecting the ink and the treatment liquid in the foregoing order. The pigment ink of black color is no dispersant ink even in the embodiment.

To respective heads, the inks and the treatment liquid are supplied from the ink tanks 108Bk1, 108Bk2, 108S, 108C, 108M and 108Y. Upon ink ejection, drive signals are supplied to electrothermal transducers, namely heaters, provided for respective ejection openings of respective heads to thereby apply thermal energy to the ink and the treatment liquid for generating a bubble. The pressure upon bubbling is used to perform ejection of the inks and the treatment liquid. For each head, 64 ejection openings are arranged at a density of 360 dpi. These 64 ejection openings are arranged in alignment in the same direction as the transporting direction Y of the printing paper 103, namely in a substantially perpendicular direction to scanning direction of each head. In the embodiment, the ejection amount per each ejection opening is set at 23 pl.

The distance between each individual head is ½ in. Accordingly, the distance between the heads 101Bk and 101S becomes 1 inch. Since the printing density in the scanning direction is 720 dpi and ejection frequency of each head is 7.2 KHz, the period from ejection of the pigment ink of the head 101Bk to ejection of the treatment liquid of the head 101S becomes 0.1 sec.

Sixth Embodiment

In a yet further embodiment of the present invention, in the serial type ink-jet printing apparatus shown in FIG. 13, the order of arrangement of the printing heads is modified, and associated with this, the order of application of the dye ink and pigment ink of black color and the treatment liquid is modified.

Namely, in FIG. 13, the arrangement order of the printing heads is modified in order of the head 101Bk1 and head 101Bk2 (other heads are the same as those of the fifth embodiment). Therefore, the pigment ink of black color, the treatment liquid, and the dye ink of black color are ejected on the printing medium in order. The distance between the heads and ejection frequency of respective head are similar to the second embodiment.

According to this embodiment, fluidization of the reaction product of the ink and the treatment liquid can be restricted in comparison with the case where the treatment liquid is applied after application of the pigment ink and the dye ink. Therefore, the occurrence of "overflow" and "sweep" can be successfully suppressed.

In the shown embodiment, the self dispersion type pigment ink is used for the pigment ink. While the pigment ink of black color is ejected from the head 101Bk1 and the dye ink of black color is ejected from the head 101Bk2 in the foregoing explanation, it is also possible to eject the dye ink of black color from the head 101Bk1, and the pigment ink of black from the head 101Bk2. Even with the later construction, the equivalent effect to that achieved by the former can be achieved. Even when an interval from the ejection of the black ink Bk to ejection of the treatment liquid S is set at 0.1 seconds, a substantially similar result of evaluation could be obtained.

Here, furthermore, a detailed explanation of the phenomenon and prediction concerning the mechanism of this case are provided. At first, there is a preferred relationship between the ratio of (self-dispersion type) pigment and dye in the ink and the ratio of cationic high polymer PAA (polyaryl amine) and the cationic surface active agent G50 (Benzelkonium chloride) in the treatment liquid.

Figure 14A:
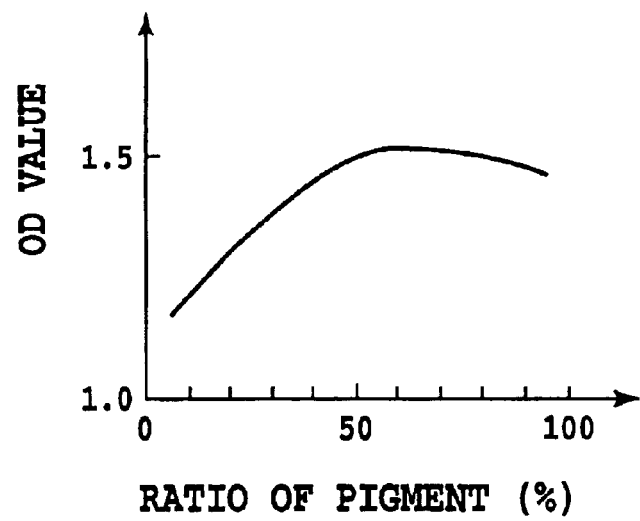
FIGS. 14A to 14C are graphs showing the relationship between the ratio of pigment and printing ability.
Figure 14B:
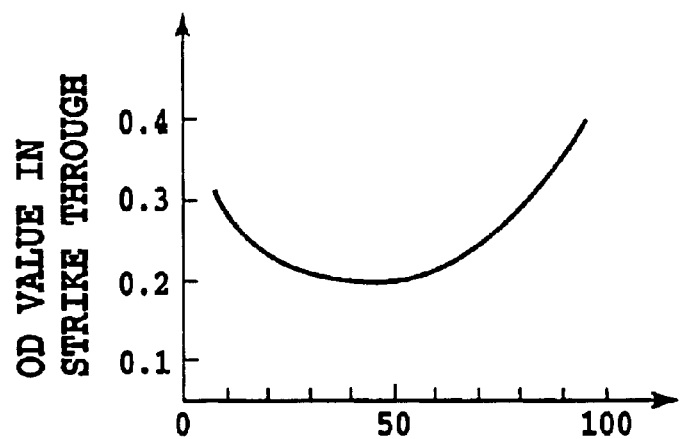
Figure 14C:
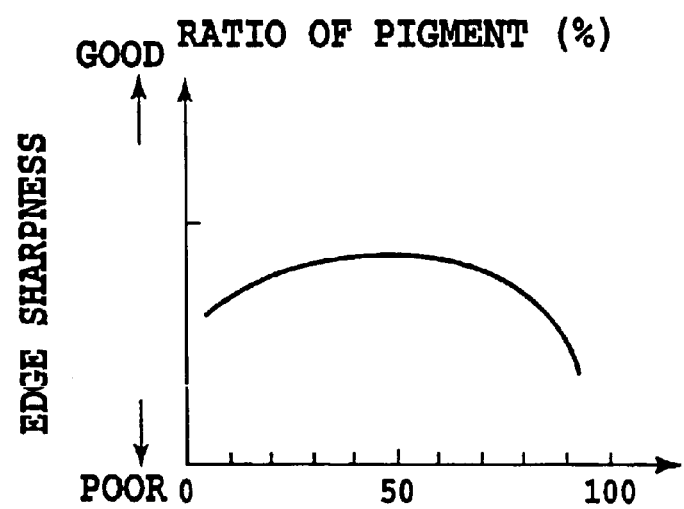

Namely, while the treatment liquid is set to contain 4% of PAA and 0.5% of G50 (ratio of PAA is about 90%) in the shown embodiment, by varying the ratio of the pigment and dye in the ink as shown in FIGS. 14A to 14C, a result where the OD value, the striking through property, and the edge sharpness become a maximum, can be obtained in the vicinity of 50%. However, according to an increase in ratio of G50 in the treatment liquid, the optical value (peak) of the quality is shifted toward a greater ratio of the pigment. Conversely, making the ratio of PAA closer to 100%, the peak is shifted toward a greater ratio of the dye. However, the peak of the OD value is not shifted significantly.

The foregoing phenomenon may be explained by the following explanation (predicated mechanism).

Figure 15A:
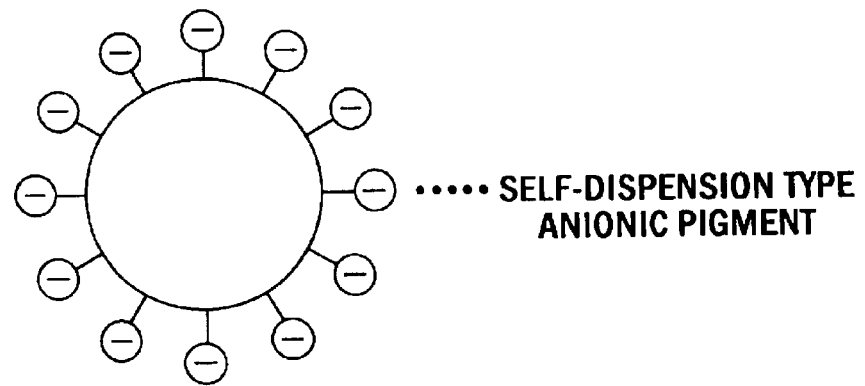
FIGS. 15A to 15D are diagrammatic illustrations showing an anionic self-dispersion type pigment, an anionic dye, a cationic surface active agent, and a cationic high polymer.
Figure 15B:
Figure 15C:
Figure 15D:
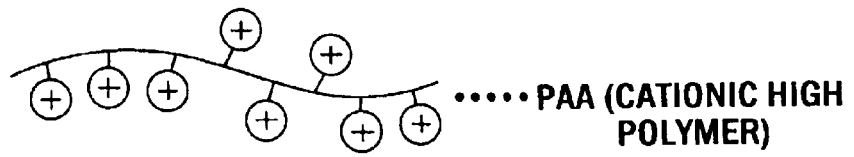
Figure 16:
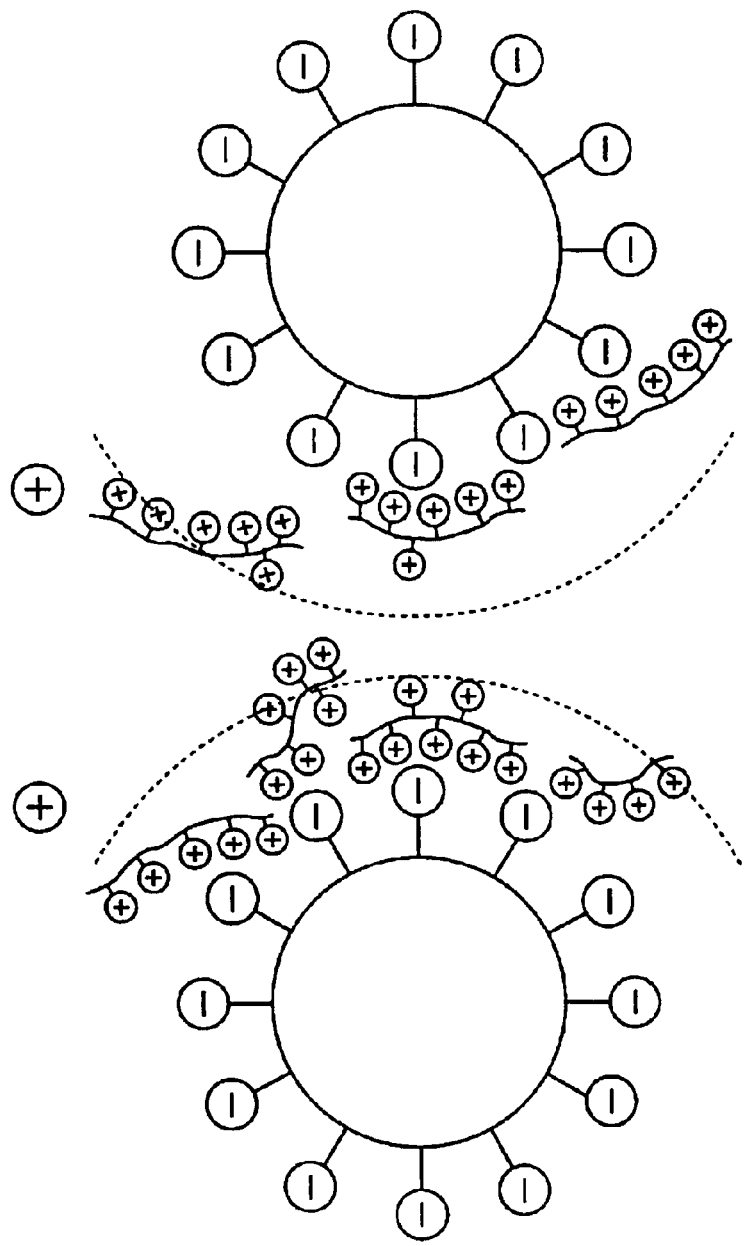
FIG. 16 is a diagrammatic illustration showing a reaction mode at the boundary portion between two anionic, self-dispersion type, pigment intervening cationic high polymers.

As a model, the self-dispersion type pigment is in a form as illustrated in FIG. 15A. Namely, the pigment is in a burr-like environment having a large number of fibrous polar groups (anionic radical) on the periphery of the pigment. PAA as a cationic high polymer is a corded substance having a plurality of cationic radicals in one molecule as shown in FIG. 15D. When a self-dispersion type pigment and PAA are mixed, a high polymer of PAA may wreathe around the periphery of the self-dispersion type pigment as shown in FIG. 16. However, since cationic PAA is not possible to be coupled with an anionic radical of all the pigment geometrically, the coupled substance as a whole is in a condition having a cationic property as shown in FIG. 16.

Accordingly, the reaction product generated by fine a particle pigment and PAA has a small intermolecular force to cause electrical repelling and difficulty in aggregating into a large block. As a result, when dye is not contained, these fine substances may appear as bleeding in smoke form on the periphery of a dot.

Figure 17:
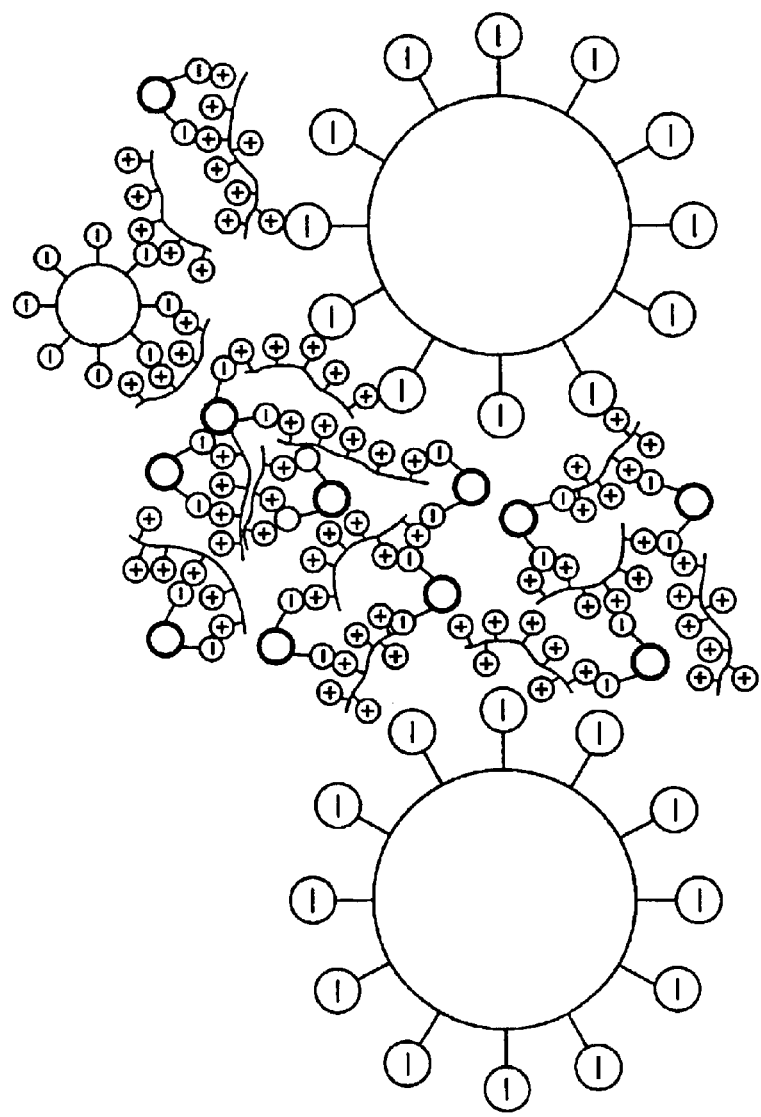
FIG. 17 is a diagrammatic illustration showing a reaction mode at the boundary portion between two anionic, self-dispersion type, pigment intervening anionic dye and cationic high polymers.

However, when dye (FIG. 15B) and pigment are present in the ink in an admixing manner, PAA and dye are coupled to be in a gel form to serve as a kind binder for binding between pigments (see FIG. 17). However, when the ratio of pigment versus dye becomes large, fine pigment, even in part, tends to be in smoke form to the degrade sharpness of the edge. Here, when G50 as a cationic surface active agent is contained in the ink in addition to PAA, the G50 (FIG. 15C) may serve to aggregate fine pigment particles, and in conjunction therewith to perform a buffering function in the reaction of dye and PAA to promote gelation to capture fine particle (see FIG. 18).

Figure 18:
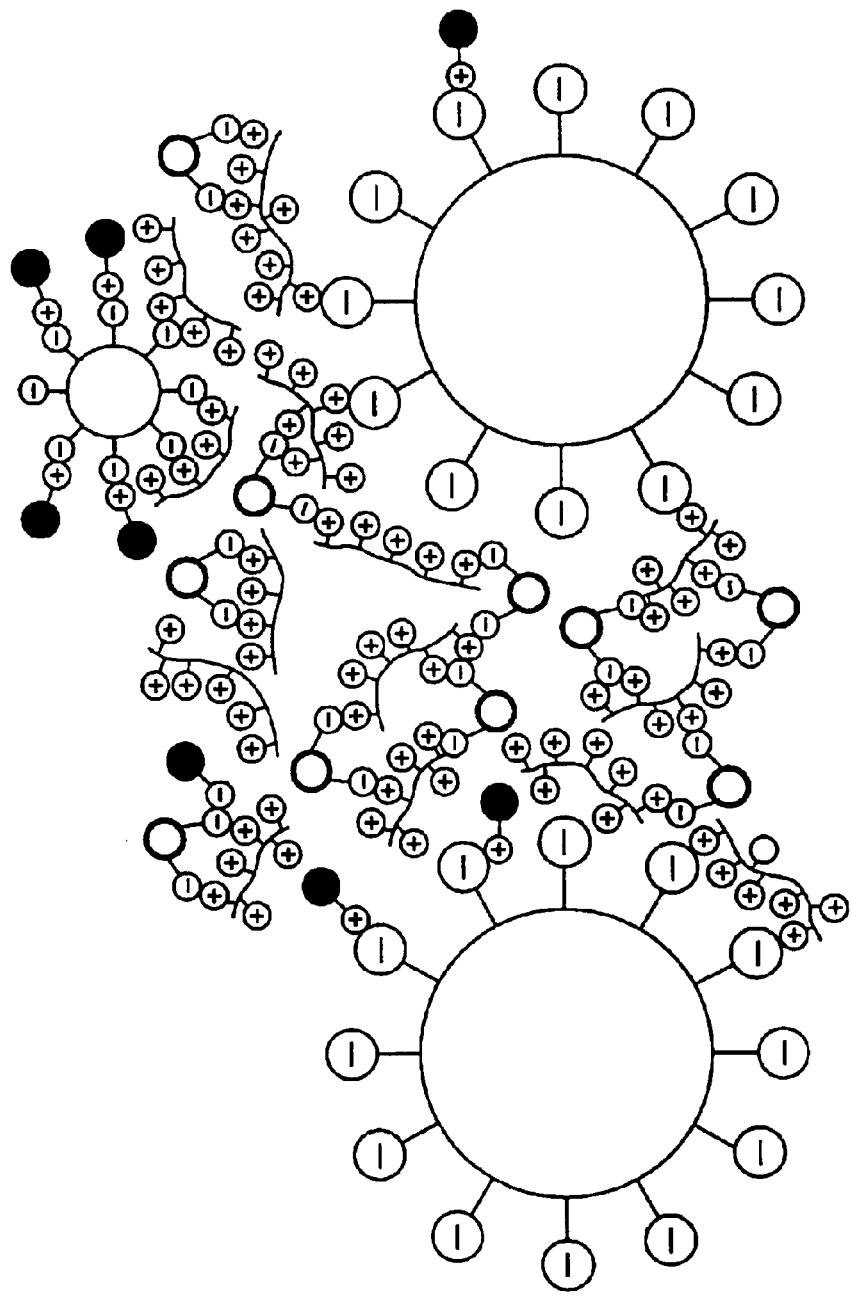
FIG. 18 is a diagrammatic illustration showing a reaction mode at the boundary portion between two anionic, self-dispersion type, pigment intervening anionic dye, cationic surface active agent and cationic high polymers.

In FIGS. 16 to 18, the reaction mode at a boundary portion between two pigments is preliminary shown. However, the reaction mode at another portion is not shown because it is complicated.

Thus, when PAA is bound with dye, the bound substance becomes stable in energy. When G50 is bound with a self-dispersion type pigment, stability in energy is also established. Namely, the mode of reaction may have a kind of selectivity.

Therefore, when the ratio of G50 in the treatment liquid becomes large, the optimal value of the quality is shifted toward a greater ratio of pigment. Conversely, when the ratio of PAA becomes large, the optimal value of the quality is shifted toward greater ratio of dye.

Here, when the ratio of PAA is high, in order to improve the possibility of causing strike through and edge sharpness, the dye may be increased to restrict flow ability of fine pigment particles. However, the reaction product generated by the reaction of PAA and only dye, is small in size. Therefore, when the penetration ability of the treatment liquid is increased for improving fixing ability, the dye may penetrate into the paper in the depth direction to make it impossible to obtain a high OD value. Therefore, pigment is required. It should be appreciated that the presence of the self-dispersion type pigment and dye as coloring material in the ink and the presence of a high molecular insolubilizing agent in the treatment liquid for making the coloring material in the ink are preferred without the presence of pigment basically, even if the penetration ability of the treatment liquid is not increased.

The present invention has been described in detail with respect to the preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus for performing printing by applying a first ink, a second ink, and a treatment liquid reacting with the first ink and the second ink onto a printing medium, the first ink and the second ink being of the same color, comprising:

an application device configured to apply the first ink, the second ink, and the treatment liquid in this sequence to the printing medium so that the first ink, the second ink and the treatment liquid are mixed on the printing medium, wherein one of the first ink and the second ink is a pigment ink containing a pigment, and the other of the first ink and the second ink is a dye ink containing a dye, wherein the penetration speed of the treatment liquid relative to the printing medium is higher than the penetration speeds of the first ink and the second ink.

2. An ink-jet printing apparatus as claimed in claim 1, wherein the pigment ink is a self dispersion type pigment ink.

3. An ink-jet printing apparatus as claimed in claim 2, wherein the pigment in the self dispersion type pigment ink is coupled with at least one kind of anionic radical on the surface directly or through another atom group.

4. An ink-jet printing apparatus as claimed in claim 3, wherein the anionic radical is at least one kind selected from the group of anionic radicals consisting of

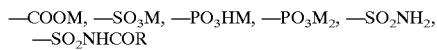

wherein M represents one of a hydrogen atom, an alkali metal, ammonium and organic ammonium, R represents an alkyl radical having a carbon atom in a range of 1 to 12, a phenyl radical which may have a substituent group, or a naphthyl radical which may have a substituent group.

5. An ink-jet printing apparatus as claimed in claim 3, wherein the another atom group is an alkyl radical having a carbon atom in a range of 1 to 12, a phenyl radical which may have a substituent group, or a naphthyl radical which may have a substituent group.

6. An ink-jet printing apparatus as claimed in claim 3, wherein more than or equal to 80% of the particles of the pigment have a grain diameter of 0.05 to 0.3 µm.

7. An ink-jet printing apparatus as claimed in claim 3, wherein more than or equal to 80% of the particles of the pigment have a grain diameter of 0.1 to 0.25 µm.

8. An ink-jet printing apparatus as claimed in claim 1, wherein the pigment ink contains a dispersant dispersing the pigment.

9. An ink-jet printing apparatus as claimed in claim 1, wherein the pigment ink and the dye ink are black ink.

10. An ink-jet printing apparatus as claimed in claim 1, wherein the treatment liquid has a penetration speed greater than or equal to 5.0 (ml/m$^2$·msec$^{1/2}$) of a Ka value by the Bristow method.

11. An ink-jet printing apparatus as claimed in claim 10, wherein at least one of the pigment ink and the dye ink has a penetration speed lower than 5.0 (ml/m$^2$·msec$^{1/2}$) of a Ka value by the Bristow method.

12. An ink-jet printing apparatus as claimed in claim 11, wherein at least one of the pigment ink and the dye ink has a penetration speed lower than 1.0 ml/m$^2$·msec$^{1/2}$ of a Ka value by the Bristow method.

13. An ink-jet printing apparatus for performing printing by applying a first ink, a second ink, and a treatment liquid reacting with the first ink and the second ink onto a printing medium, the first ink and the second ink being of the same color, comprising:

an application device configured to apply the first ink, the second ink, and the treatment liquid in this sequence to the printing medium so that the first ink, the second ink and the treatment liquid are mixed on the printing medium, wherein one of the first ink and the second ink is a pigment ink containing a self-dispersion type pigment, and the other of the first ink and the second ink is a dye ink containing a dye.

14. An ink-jet printing apparatus as claimed in claim 13, wherein said arranging means arranges said pigment ink ejecting portion, said dye ink ejecting portion and said treatment liquid ejecting portion in sequential order in a predetermined direction, and said control means controls said pigment ink ejecting portion, said dye ink ejecting portion, and said treatment liquid ejecting portion to eject the pigment ink, the dye ink and the treatment liquid onto the printing medium in sequential order for sequentially mixing.

15. An ink-jet printing apparatus as claimed in claim 13, wherein said arranging means arranges said dye ink ejecting portion, said pigment ink ejecting portion and said treatment liquid ejecting portion in sequential order in a predetermined direction, and said control means controls said pigment ink ejecting portion, said dye ink ejecting portion, and said treatment liquid ejecting portion to eject the dye ink, the pigment ink and the treatment liquid onto the printing medium in sequential order for sequentially mixing.

16. An ink-jet printing apparatus as claimed in claim 13, wherein said arranging means arranges said pigment ink ejecting portion, said treatment liquid ejecting portion and said dye ink ejecting portion in sequential order in a predetermined direction, and said control means controls said pigment ink ejecting portion, said dye ink ejecting portion, and said treatment liquid ejecting portion to eject the pigment ink, the treatment liquid and the dye ink onto the printing medium in sequential order for sequentially mixing.

17. An ink-jet printing apparatus as claimed in claim 13, wherein said arranging means arranges said dye ink ejecting portion, said treatment liquid ejecting portion and said pigment ink ejecting portion in sequential order in a predetermined direction, and said control means controls said pigment ink ejecting portion, said dye ink ejecting portion, and said treatment liquid ejecting portion to eject the dye ink, the treatment liquid and the pigment ink onto the printing medium in sequential order for sequentially mixing.

18. An ink-jet printing apparatus as claimed in claim 13, wherein said arranging means further arranges a cyan ink ejecting portion ejecting a cyan ink, a magenta ink ejecting portion ejecting a magenta ink and an yellow ink ejecting portion ejecting an yellow ink, following arrangement positions of said pigment ink ejecting portion, said dye ink ejecting portion and said treatment liquid ejecting portion.

19. An ink-jet printing apparatus as claimed in claim 13, wherein said ink ejecting portion and said treatment liquid ejecting portion contain ink ejection openings and treatment liquid ejecting openings, respectively, arranged within a range corresponding to an entire width of a printing region in the printing medium.

20. An ink-jet printing apparatus as claimed in claim 13, further comprising driving means for moving said ink ejecting portion and said treatment liquid ejecting portion relative to the printing medium while maintaining the positional relationship arranged by said arranging means, and wherein said control means causes the relative movement by scanning of respective ejecting portions relative to the printing medium by controlling said driving means.

21. An ink-jet printing apparatus as claimed in claim 13, wherein said ink ejecting portion and said treatment liquid ejecting portion generate bubbles in the ink and the treatment liquid, respectively, using thermal energy and eject the ink and the treatment liquid by pressure of the bubble, respectively.

22. A printing method performing printing by applying a first ink, a second ink, and a treatment liquid reacting with the first ink and the second ink onto a printing medium, the first ink and the second ink being of the same color, comprising:

a step of applying the first ink, the second ink, and the treatment liquid onto the printing medium in this sequence so that the first ink, the second ink and the treatment liquid are mixed on the printing medium, wherein one of the first ink and the second ink is a pigment ink containing a self-dispersion type pigment, and the other of the first ink and the second ink is a dye ink containing a dye.

23. A printing method as claimed in claim 22, wherein said pigment ink, said dye ink and said treatment liquid are applied on said printing medium in sequential order and mixed thereon.

24. A printing method as claimed in claim 22, wherein said dye ink, said pigment ink and said treatment liquid are applied on said printing medium in sequential order and mixed thereon.

* * * * *

UNITED STATES PATENT AND TRADEMARK OFFICE
CERTIFICATE OF CORRECTION

PATENT NO. : 6,786,587 B2
APPLICATION NO. : 10/340762
DATED : September 7, 2004
INVENTOR(S) : Koitabashi It is certified that error appears in the above-identified patent and that said Letters Patent is hereby corrected as shown below:

IN THE DRAWINGS:

Figure 15A
"SELF-DISPENSION" should read --SELF-DISPERSION--.

IN THE DISCLOSURE:

COLUMN 1:
Line 43, "that" should be deleted.
Line 57, "plane" should read --plain--.

COLUMN 2:
Line 65, "cause" should read --caused--.

COLUMN 3:
Line 20, "reaction-with" should read --reaction with--.

COLUMN 4:
Line 10, "self dispersion" should read --self-dispersion--.
Line 21, "self dispersion" should read --self-dispersion--.
Line 34, "self dispersion" should read --self-dispersion--.
Line 36, "self dispersion" should read --self-dispersion--.
Line 45, "self" should read --self- --.
Line 53, "self dispersion" should read --self-dispersion--.

COLUMN 5:
Line 51, "follow." should read --follows.--.

COLUMN 6:
Line 1, "gel form" should read --gel-form--.
Line 33, "inkjet" should read --ink-jet--.

COLUMN 7:
Line 14, "long a" should read --long as--.
Line 50, "advantageous," should read --advantageous--.

COLUMN 8:
Line 62, "head," should read --heads,--.
Line 64, "is correlated." should read --are correlated.--.

UNITED STATES PATENT AND TRADEMARK OFFICE
CERTIFICATE OF CORRECTION

PATENT NO. : 6,786,587 B2
APPLICATION NO. : 10/340762
DATED : September 7, 2004
INVENTOR(S) : Koitabashi It is certified that error appears in the above-identified patent and that said Letters Patent is hereby corrected as shown below:

COLUMN 9:
Line 65, "dye ink" should read --dye ink.--.

COLUMN 10:
Line 50, "an printing" should read --a printing--.

COLUMN 11:
Line 33, "the mixed" should read --mixed--.
Line 42, "to application" should read --for application--.

COLUMN 12:
Line 13, "follow." should read --follows.--

COLUMN 13:
Line 2, "shorted" should read --shortened-- and "one" should be deleted.
Line 31, "for this" (first occurrence) should read --the--.

COLUMN 14:
Line 20, "This the" should read --This is--.
Line 39, "aranged" should read --arranged--.

COLUMN 16:
Line 17, "no dispersant" should read --no-dispersant--.
Line 20, "illustration to" should read --illustration for--.

COLUMN 17:
Line 6, "EMBODIMENT" should read --EMBODIMENTS--.
Line 25, "ahead" should read --a head--.

COLUMN 18:
Line 12, "varies" should read --vary--.
Line 14, "control" should read --controlling--.
Line 48, "hereinafter" should be deleted.

COLUMN 19:
Line 63, "there between" should read --therebetween--.

COLUMN 21:
Line 14, "trietylene glycol" should read --triethylene glycol--.
Line 20, "follow." should read --follows.--.
Line 39, "an hydrophilic" should read --a hydrophilic--.

UNITED STATES PATENT AND TRADEMARK OFFICE
CERTIFICATE OF CORRECTION

PATENT NO. : 6,786,587 B2
APPLICATION NO. : 10/340762
DATED : September 7, 2004
INVENTOR(S) : Koitabashi It is certified that error appears in the above-identified patent and that said Letters Patent is hereby corrected as shown below:

COLUMN 22:
Line 20, "other" should read --another--.
Line 48, "no dispersant" should read --no-dispersant--.

COLUMN 23:
Line 30, "within        --Within
       10 Sec." should read     10 Sec.--.
Line 49, "Machbeth" should read --Macbeth--.
Line 53, "set off" should read --set-off--.

COLUMN 24:
Line 52, "not shown motor." should read --motor (not shown).--.

COLUMN 25:
Line 14, "illustration" should read --illustrations--.
Line 65, "openings." should read --opening.--.
Line 66, "no dispersant" should read --no-dispersant--.

COLUMN 26:
Line 18, "12 inch" should read --1/2 inch--.

COLUMN 27:
Line 11, "no dispersant" should read --no-dispersant-- and "ink," should read --ink--.

COLUMN 28:
Line 34, "medium" should read --medium,--.

COLUMN 29:
Line 8, "not shown motor." should read --motor (not shown).--.
Line 10, "101k2" should read --101Bk2--.

COLUMN 30:
Line 40, "fine a" should read --a fine--.
Line 51, "the degrade" should read --degrade the--.
Line 57, "particle" should read --particles--.
Line 60, "preliminary" should read --preliminarily--.

COLUMN 31:
Line 49, "self dispersion" should read --self-dispersion--.
Line 52, "self dispersion" should read --self-dispersion--.

UNITED STATES PATENT AND TRADEMARK OFFICE
CERTIFICATE OF CORRECTION

PATENT NO.       : 6,786,587 B2
APPLICATION NO.  : 10/340762
DATED            : September 7, 2004
INVENTOR(S)      : Koitabashi It is certified that error appears in the above-identified patent and that said Letters Patent is hereby corrected as shown below:

<u>COLUMN 33</u>:
Line 13, "an" should read --a--.
Line 14, "an" should read --a--.

<u>COLUMN 34</u>:
Line 5, "bubble," should read --bubbles,--.

Signed and Sealed this

Twenty-fourth Day of April, 2007

JON W. DUDAS
*Director of the United States Patent and Trademark Office*